United States Patent
Yagita

(10) Patent No.: US 7,583,400 B2
(45) Date of Patent: Sep. 1, 2009

(54) PRINT CONTROLLING METHOD AND APPARATUS THAT PREVENTS TRANSMISSION OF PRINT DATA FROM CLIENTS UNTIL A PREDETERMINED TIME THAT IS SCHEDULED BASED ON WHEN THE CLIENT REGISTERS WITH THE MANAGING SECTION

(75) Inventor: Takashi Yagita, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 845 days.

(21) Appl. No.: 11/200,024

(22) Filed: Aug. 10, 2005

(65) Prior Publication Data

US 2006/0039029 A1 Feb. 23, 2006

(30) Foreign Application Priority Data

Aug. 18, 2004 (JP) .................... 2004-238624

(51) Int. Cl.
G06F 15/00 (2006.01)
(52) U.S. Cl. .................. 358/1.15; 358/1.14; 709/203
(58) Field of Classification Search ....... 358/1.13–1.16; 709/245, 202, 201, 203, 217, 225; 710/100, 710/240, 244
See application file for complete search history.

(56) References Cited

U.S. PATENT DOCUMENTS

| 4,829,468 | A  | * | 5/1989 | Nonaka et al. ............. 358/1.18 |
| 5,528,375 | A  | * | 6/1996 | Wegeng et al. .............. 358/296 |
| 6,466,326 | B1 | * | 10/2002 | Shima ........................ 358/1.12 |
| 6,785,727 | B1 | * | 8/2004 | Yamazaki .................... 709/229 |
| 6,874,034 | B1 | * | 3/2005 | Hertling ...................... 709/245 |
| 2002/0083114 | A1 | * | 6/2002 | Mazzagatte et al. ........ 709/100 |
| 2002/0131069 | A1 | * | 9/2002 | Wanda ....................... 358/1.14 |
| 2003/0076525 | A1 | * | 4/2003 | Hikawa ...................... 358/1.14 |
| 2003/0086115 | A1 | * | 5/2003 | Bhatti ........................ 358/1.15 |
| 2004/0008363 | A1 | * | 1/2004 | Suzuki et al. .............. 358/1.14 |

FOREIGN PATENT DOCUMENTS

JP 2-146618 6/1990

OTHER PUBLICATIONS

U.S. Appl. No. 11/357,042 (Yagita), filed Feb. 21, 2006.

* cited by examiner

*Primary Examiner*—Kimberly A Williams
(74) *Attorney, Agent, or Firm*—Fitzpatrick, Cella, Harper & Scinto

(57) ABSTRACT

A print control device that can communicate with a plurality of information processing apparatuses includes a managing section that manages scheduling requests for print jobs from the information processing apparatuses; and a control section that prevents reception of print data not based on scheduling requests if schedule requests are registered in the managing section.

18 Claims, 20 Drawing Sheets

US 7,583,400 B2

PRINT CONTROLLING METHOD AND APPARATUS THAT PREVENTS TRANSMISSION OF PRINT DATA FROM CLIENTS UNTIL A PREDETERMINED TIME THAT IS SCHEDULED BASED ON WHEN THE CLIENT REGISTERS WITH THE MANAGING SECTION

FIELD OF THE INVENTION

The present invention relates to a device and method for controlling printing which is located, for example, at a front end of a print device and which has a function for scheduling print jobs received from an information processing apparatus.

BACKGROUND OF THE INVENTION

In a known form of a network environment, a plurality of users share a network print device. The sharing of the print device by a plurality of users increases a process load and requires storage means of a large capacity in order to deal with these users. Under these circumstances, Japanese Patent Laid-Open No. 02-146618 describes a printing system intended to reduce the required capacity of a memory for the print device as well as the process load. The printing system described in Japanese Patent Laid-Open No. 02-146618 transmits only a scheduling request for transmission of print data from a client computer to a print device, as reservation information. The print device, which has received the scheduling request, transmits a signal permitting transmission of print data, on the basis of a scheduling process. Then, the client computer transmits print data including drawing information to the print device.

According to the invention described in Japanese Patent Laid-Open No. 02-146618, the print device permits the client computer to transmit print data when it is convenient for the print device. Thus, this invention does not require a control section of the print device to have such a high processing capability as required for a method compared to a method in which print data are transmitted to the print device one after another, thus imposing an excessive process load on the print device. As a result, an inexpensive print device can be provided.

On the other hand, with such a print device as described in Japanese Patent Laid-Open No. 02-146618, a computer connected to the print device by radio communication may throw print data into the print device via radio communication without a print reservation, using an LPR (Line Printer Remote) function. In this case, even if a plurality of client computer have made a plurality of print reservations, the schedule for transmission of print data from the client computers is upset; the schedule is based on print reservations. For example, it is assumed that a print device having a print reservation function is utilized by clients that can utilize the print reservation function of the print device and those that cannot utilize the print reservation function of the print device. In this case, a client that cannot utilize the print reservation function throws a print job without a reservation. Consequently, the print device may execute this job while neglecting print reservations made by clients that can utilize the print reservation function.

SUMMARY OF THE INVENTION

The present invention is made in order to solve the above problem. An object of the present invention is to allow printing operations based on print reservations to be performed in order even in an environment having the mixture of various systems for throwing print data into a print device, for example, a system utilizing the print reservation function and a system not utilizing the print reservation function. Another object of the present invention is to provide a mechanism that allows printing operations based on print reservations to be performed in order, while enabling performance of a printing operation based on another print job throwing system.

To accomplish these objects, the present invention comprises the configuration described below.

A print control device which can communicate with a plurality of information processing apparatuses, the device comprising:

a managing section that manages at least one scheduling request for print job from any one of the information processing apparatuses; and a control section that prevents reception-of print data not based on scheduling request if at least one schedule request is registered in the managing section.

This configuration enables printing operations based on print reservations to be performed in order even in an environment in which various systems for throwing print data into a print device are mixed. The configuration also makes it possible to provide a mechanism that allows printing operations based on print reservations to be performed in order, while enabling performance of a printing operation based on another print job throwing system.

Other features and advantageous of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

With reference to the drawings, description will be given of the best mode for carrying out the present invention.

<System Configuration>

Figure 1:
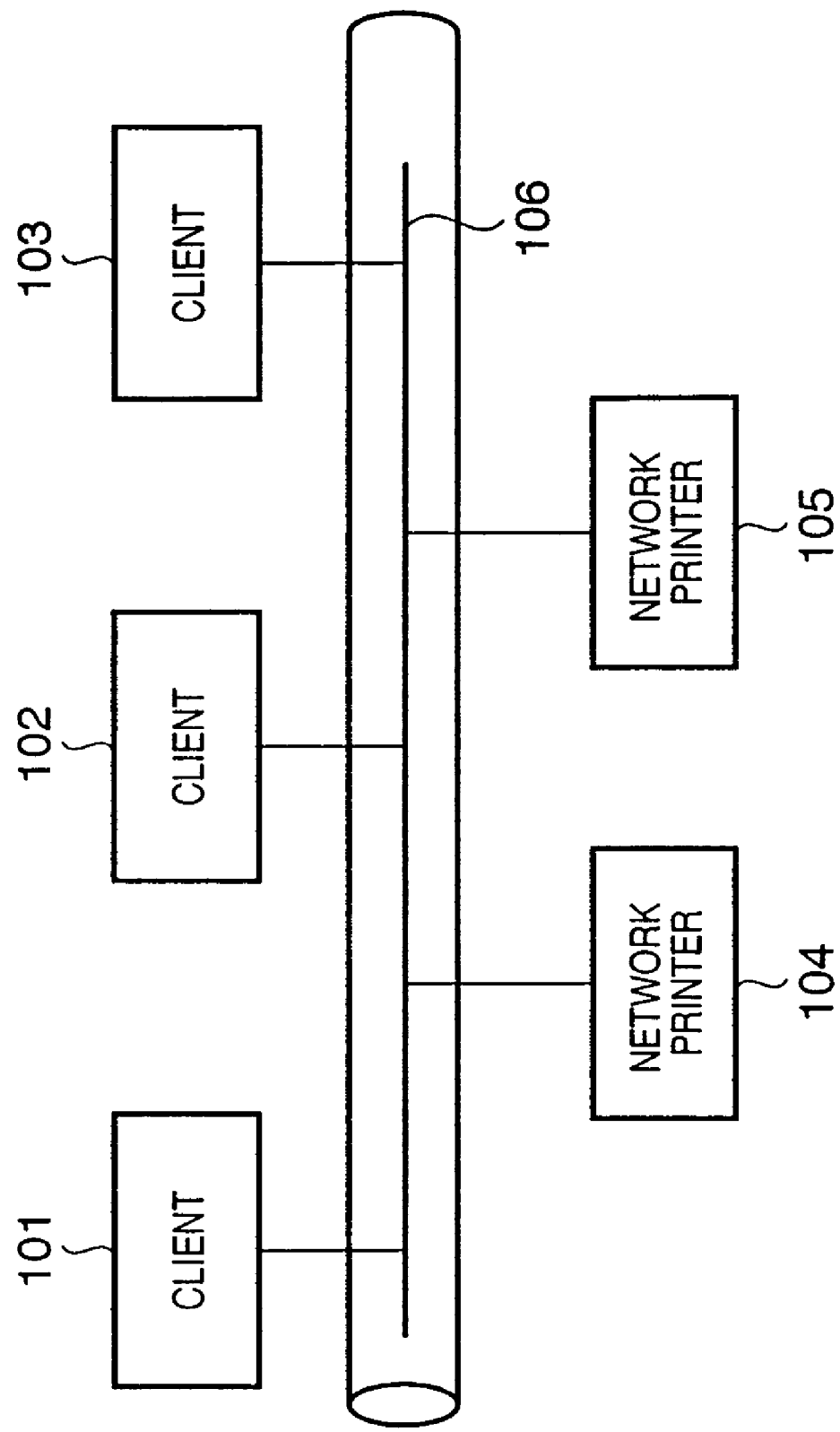
FIG. 1 is a block diagram generally showing the configuration of a print system as an embodiment of the present invention.

FIG. 1 is a block diagram generally showing the configuration of a print system according to an embodiment of the present invention. The present print system includes clients (computers) 101 to 103 serving as information processing apparatuses and network printers 104 and 105 serving as print devices. The clients and the network printers are connected together to constitute a network.

The clients (computers) 101 to 103 each store a print control program so that it can execute the print control program. The clients 101 to 103 each have not only a function for managing the network printers 104 and 105, included in the present print system, but also a function for accumulating files used on the network and monitoring the usage of the network. Specifically, the clients (computers) 101 to 103 each have a function for creating a print job and issuing a schedule request to a scheduler in either of the network printers 104 and 105, and a function for starting transfer of print data in response to an instruction from the scheduler of the network printer 104 or 105. Here, the scheduling request is defined. The scheduling request is a print reservation not accompanied by substantial print data as shown at 1102 in FIG. 11, described later. At 1102 in FIG. 11, the print reservation is called job information.

When any of the clients issues a scheduling request to a print control device, the print control device manages the order of scheduling requests and permits the transfer of print data to the client having issued the scheduling request, in accordance with the managed order.

The network printers 104 and 105 are each a print device that receives a print job including print data from any of the clients (computer) 101 to 103. The network printers 104 and 105 each analyze and execute the received print job. The network printers 104 and 105 may each be a print device based on any system such as a laser beam printer employing an electrophotographic system, ink jet printer employing an ink jet system, or a printer employing a thermal transfer system.

Further, the network printers 104 and 105 each have a function for receiving print requests from the plurality of clients (computers) 101 to 104, determining the order of the received print requests, and issuing a print instruction. Furthermore, the network printers 104 and 105 each have a function for monitoring print jobs transferred to the network printers 104 and 105, monitoring the statuses of the network printers 104 and 105, and notifying the clients (computers) 101 to 104 of the end of printing or a printer status.

The communication between the apparatuses and devices included in the present print system may be wired communication utilizing an Ethernet (registered trade mark) cable or radio communication utilizing an electric wave or light. Moreover, all the cable communications of the computer and network printers in the present system desirably support the TCP/IP on the basis of radio communication.

<Configuration of Print Server and Client>

Figure 2:
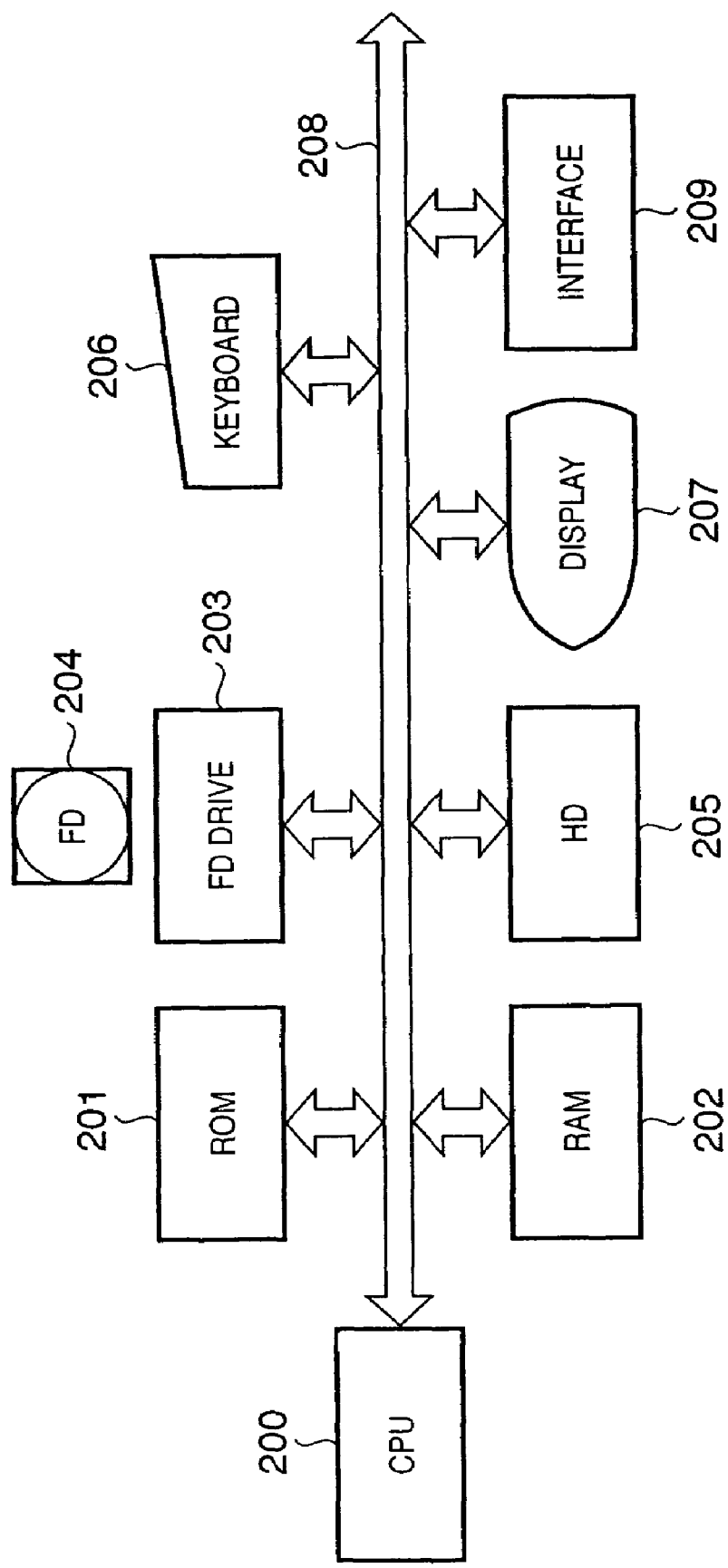
FIG. 2 is a block diagram illustrating the hardware configuration of a client.

FIG. 2 is a block diagram illustrating the hardware configuration of one of the clients (computers) 101 to 103, shown in FIG. 1.

In FIG. 2, a CPU 200 is control means for reading and executing any of application programs stored in the HD (hard disc) 205, a printer driver program, an OS, a print control program, and the like and controlling temporal storage in a RAM 202 of information, files, and the like required for the execution of the programs.

A ROM 201 is storage means for storing programs such as a basic I/O program and various data such as font data used for word processing and template data. The RAM 202 is temporary storage means functioning as a main memory, a work area, or the like for the CPU 200.

Figure 5:
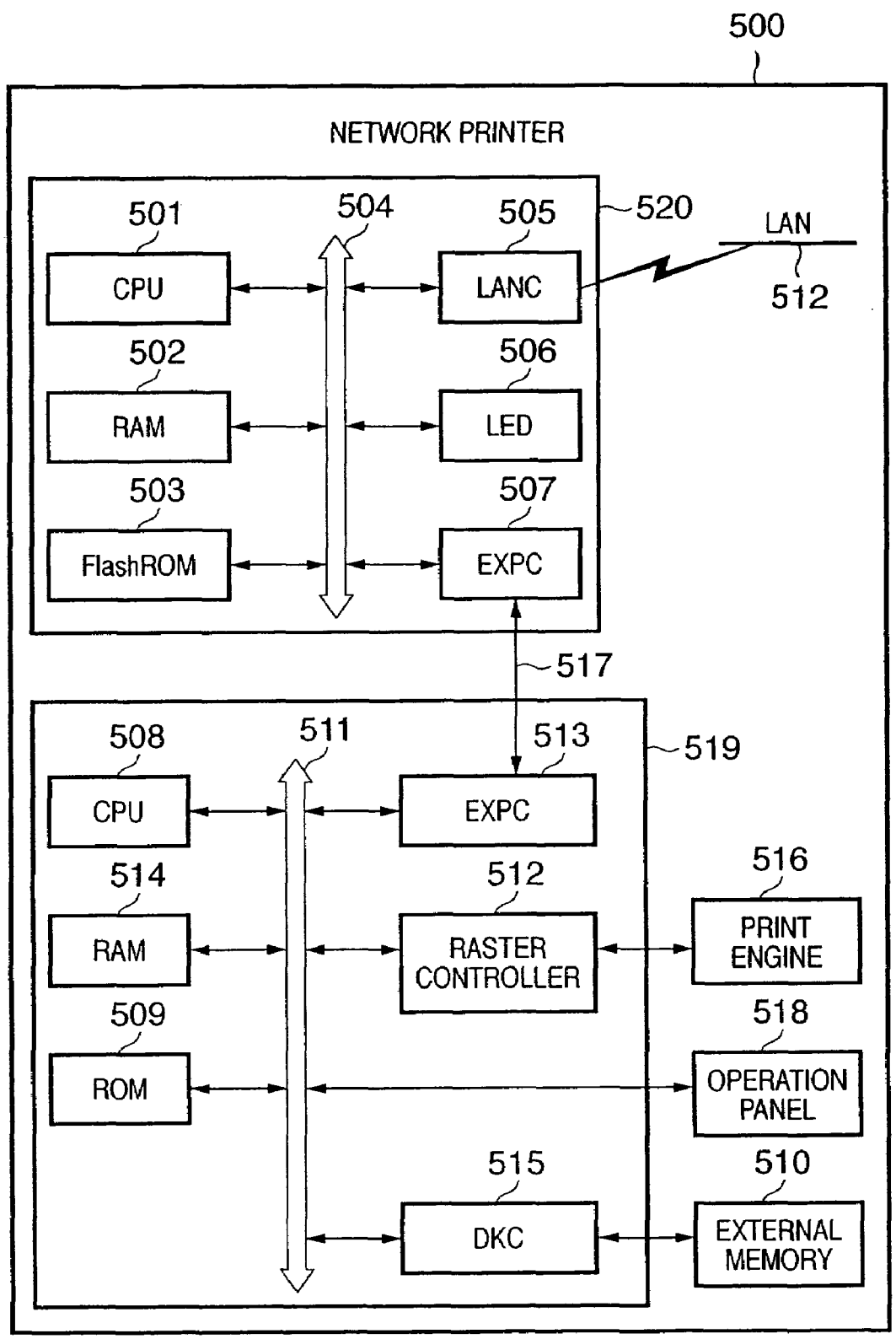
FIG. 5 is a block diagram illustrating the hardware configuration of a printer.

An FD (flexible disk) drive 203 is storage medium loading means for loading a program or the like stored in an FD 204 serving as a storage medium, into the present computer system as shown in FIG. 5, described below. The clients (computers) 101 to 103 may comprise another storage medium loading means in place of or in addition to the FD drive 203. Any other computer readable storage media may be used such as a CD-ROM, a CD-R, a CD-RW, a PC card, a DVD, an IC memory card, an MO, and a memory stick.

An HD 205 is external storage means functioning as a mass memory and stores the application programs, printer driver program, OS, print control program, and other related programs. Moreover, spooler serving as spool means is provided in the HD 205. The clients (computers) 101 to 103 each include the spooler as the spool means.

A keyboard 206 is instruction input means used by a user to input instructions such as device control commands to the print server 101 and clients 107 and 108.

A display 207 is display means for displaying commands input from the keyboard 206 and the statuses of the printers 104 and 105. Actually, the operating system operating on each of the clients (computers) 101 to 103 instructs the display means to display any of the commands and statuses. The present print process program instructs the operating system to display a resource file, thus providing displays described below. Reference numeral 208 denotes a system bus responsible for the floe of data through the computers serving as the clients (computers) 101 to 103.

An interface 209 is I/O means. The print server 101 or the client 107 or 108 transmits data to and from another apparatus on the network via the interface 209.

<Description of Memory Map and the Like>

Figure 3:
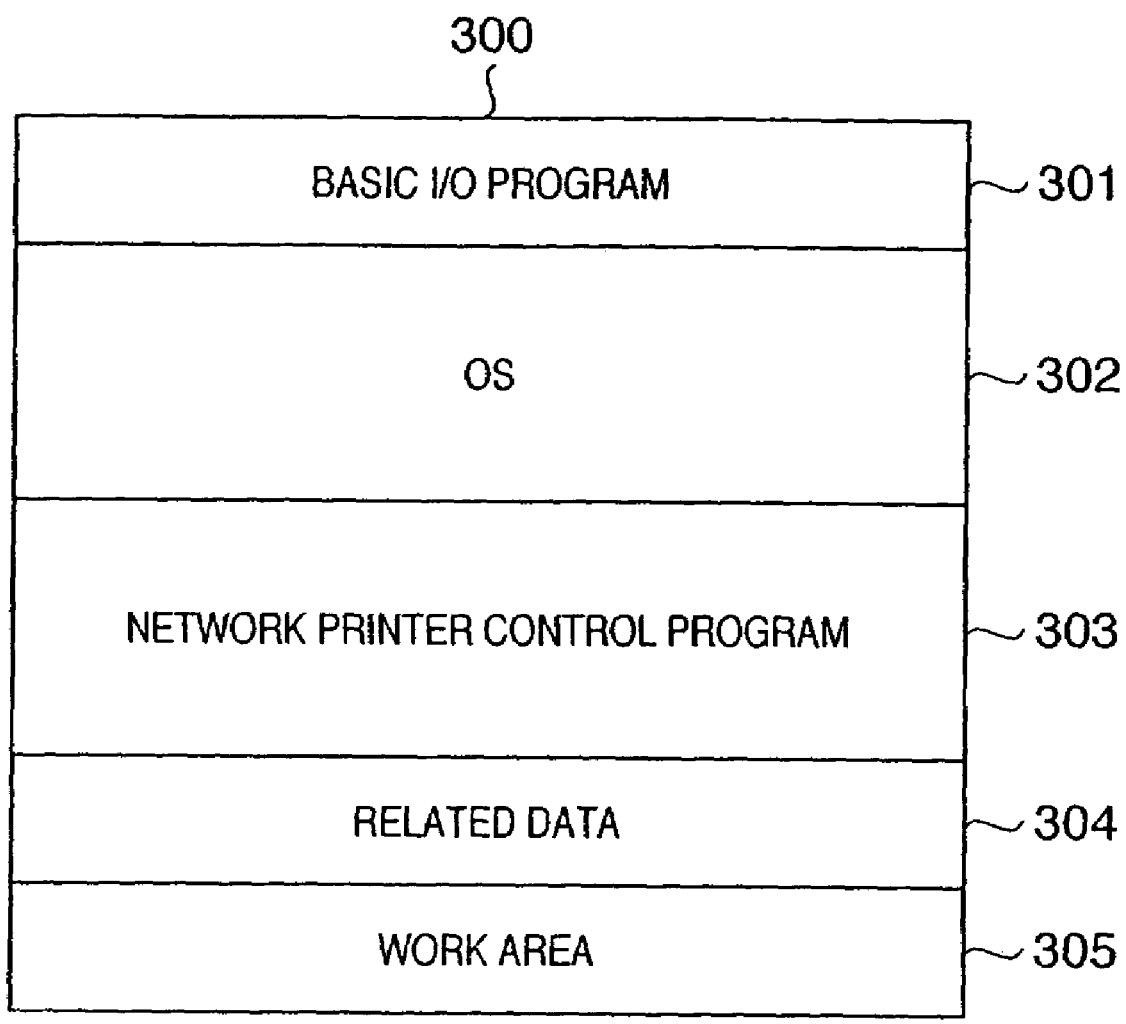
FIG. 3 is a diagram showing an example of a memory map for a RAM 202 shown in FIG. 2.

FIG. 3 is a diagram showing an example of a memory map for the RAM 202, shown in FIG. 2. This memory map applies to the case in which the print control program has been loaded into the RAM 202 and is thus executable.

The print control program and related data from the FD 204 may be installed in the HD 205 and then loaded from the HD 205 into the RAM 202. Alternatively, the print control program and related data may be loaded from the FD 204 directly into the RAM 202. Moreover, the print control program may be stored in the ROM 201 and constitutes a part of the memory map so that the CPU 200 can directly execute the print control program. Alternatively, the hardware devices may be replaced with software that implements functions equivalent to the functions of the devices.

In the client, the print control program performs control such as transfer of print data, an instruction on a change of a print job destination, or an instruction on a change of print order.

The basic I/O program is stored in an area 301. The basic I/O program has, for example, an IPL (Initial Program Loading) function for causing the OS to start operation when the OS is loaded from the HD 205 into the RAM 202 in response to power-on of the apparatus (print server 101 or the client 107 or 108).

The OS (Operating System) is stored in an area 302. The print control program is stores in an area 303. The related data is stored in an area 304. An area 305 is a work area in which the CPU 200 executes various programs.

Figure 4:
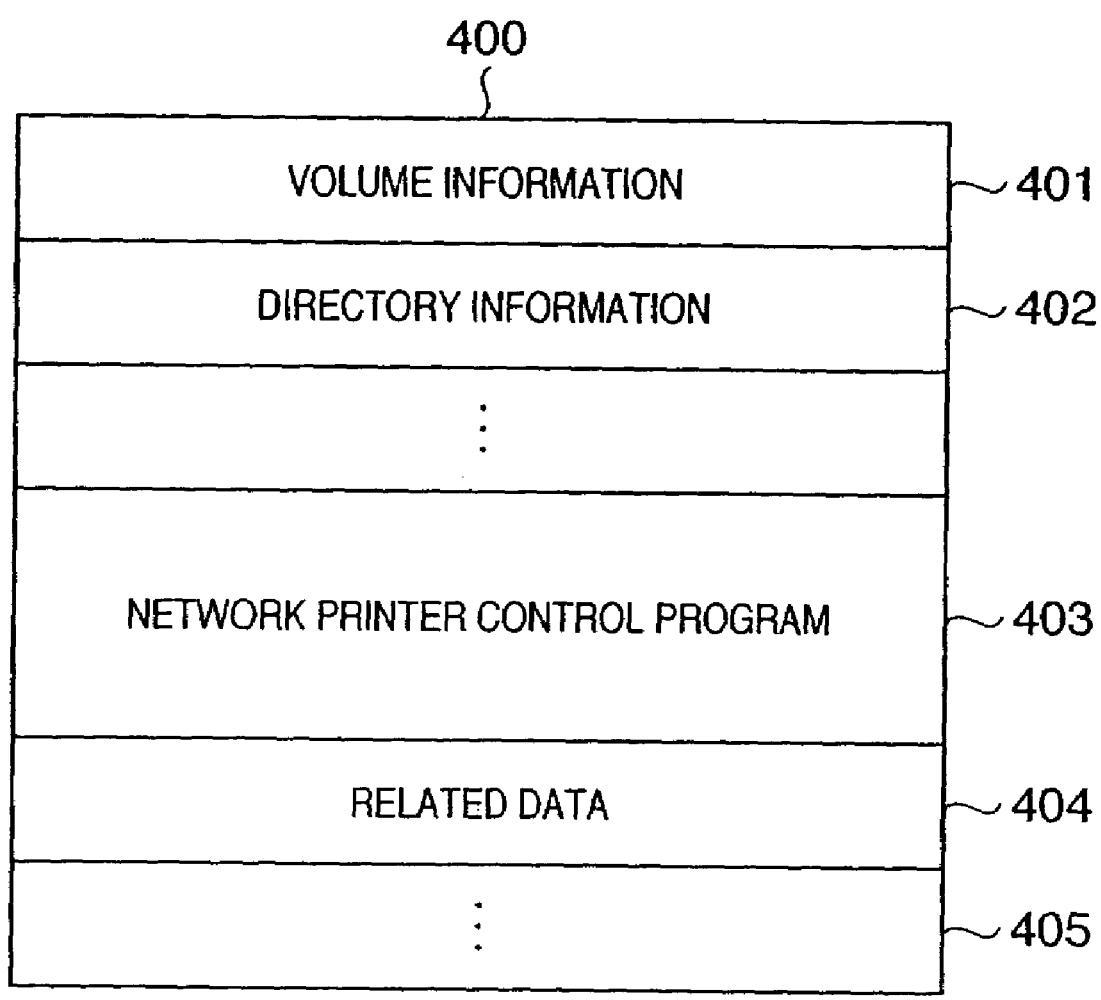
FIG. 4 is a diagram showing an example of a memory map for an FD 204 shown in FIG. 2.

FIG. 4 is a diagram showing an example of a memory map for the FD 204, shown in FIG. 2. In FIG. 4, data 400 is data contents of the FD 204 and includes volume information 401, directory information 402 indicative of the data, the print control program 403, and the related data 404.

FIG. 5 is a block diagram illustrating the hardware configuration of the network printer 104 or 105 according to the embodiment of the present invention. A printer 500 is composed of a network printer server 520 and a printer controller 519 which serve as different control systems. In the network print server 520, a network print server CPU 501 executes control programs stored in a rewritable flash ROM 503. The CPU 501 uses a predetermined network communication protocol to communicate with a plurality of external apparatus (not shown in the drawings) connected to a local area network (LAN 512) via a network controller (LANC 505) connected to a system bus 504. The CPU 501 integrally controls various data transmission requests such as print data and print control instructions sent by the external apparatus. The CPU 501 performs appropriate data transfer control on a printer controller 519 connected via an expanded interface controller (EXPC 507).

A RAM 502 is used as a temporary storage area such as a main memory or a work area for the CPU 501. An LED 506 is used as a display section showing the operation status of a network print server. The LED 506 can show the status (LINK) of the electric connection between the network controller (LANC 505) and the local area network (LAN 512) and various operation statuses such as a network communication mode (10Base, 100Base, full duplex, or half duplex), using its blinking pattern and color. An interface 517 joining the network print server 520 and the printer controller 519 is composed of a connector (not shown in the drawings).

Accordingly, only the network print server 520 can be removed and installed in another printer 500 having the same configuration.

In the printer controller 519, a CPU 508 is a CPU for the printer controller. The CPU 508 executes control programs or the like stored in a ROM 509 or in an external memory 510 connected to a disk controller (DKC 515). The CPU 508 integrally controls accesses to various devices connected to a system bus 511 on the basis of resource data (resource information) or the like. Moreover, the CPU 508 allows a raster controller 512 to generate output image information on the basis of print data received from the network print server 520 connected to an expanded interface controller (EXPC 513). The CPU 508 then outputs an image signal to a print engine 516.

A RAM 514 functions as a main memory, a work area, or the like for the CPU 508. The RAM 514 can increase its own capacity using an optional RAM connected to an additional port (not shown in the drawings).

Buttons and a display section such as a liquid crystal panel or an LED are disposed on an operation panel (operation section) 518; the buttons are used to perform operations such as setting of an operation mode or the like for the printer 500 and cancellation of print data, and the display section shows the operation status of the printer 500.

Figure 6:
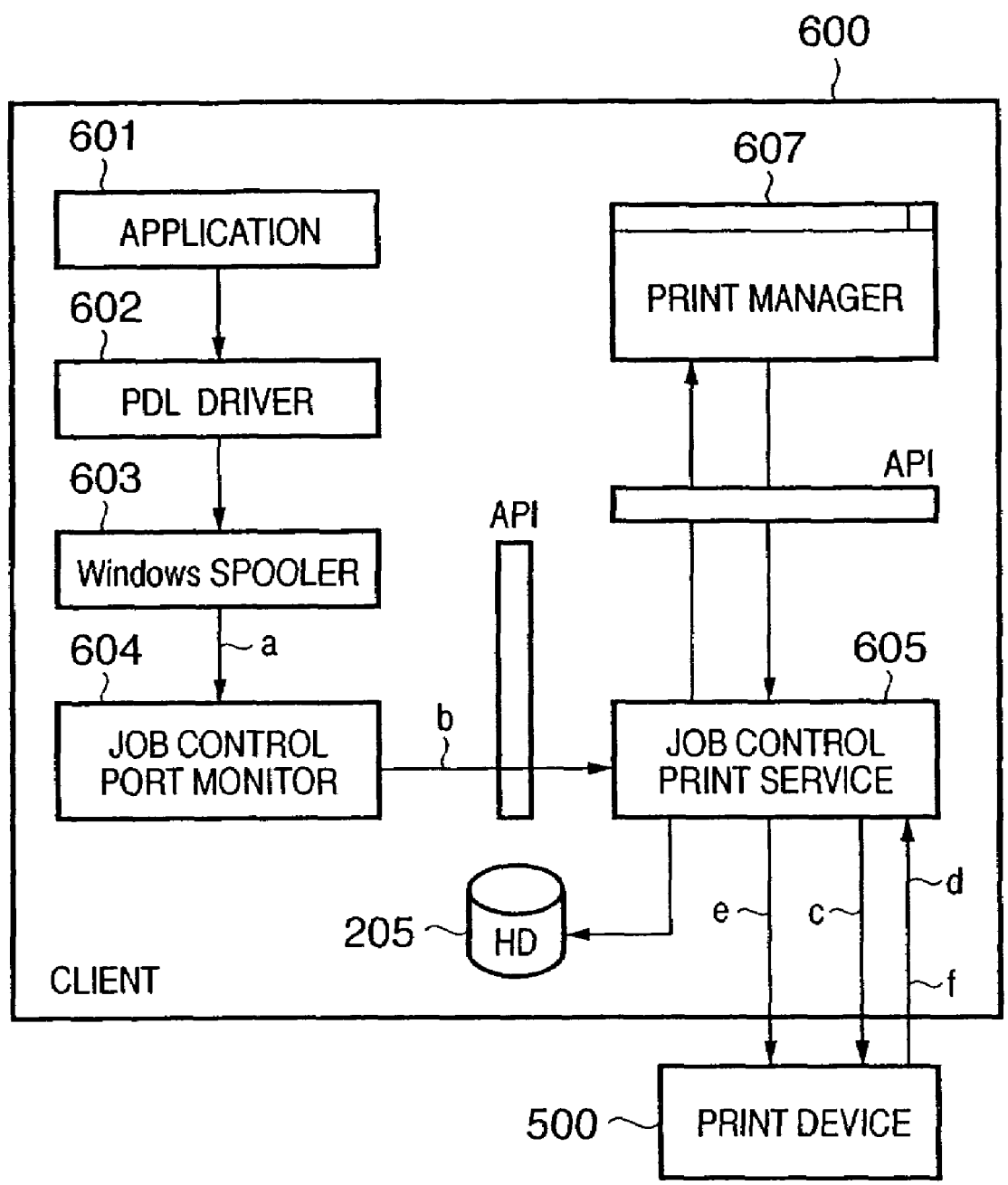
FIG. 6 is a diagram showing an example of the software configuration of a client print system.

Now, a brief description will be given of the software configuration of the client in the present print system. FIG. 6 is a diagram showing an example of the software configuration of each of the clients 101 to 103. The arrows between the components in the figure indicate how a print job containing a drawing command issued by an application is processed. The software component shown in each block is executed by the CPU 200 in FIG. 2 to realize a desired function.

Upon reception of a print instruction, a common application program 601 such as Microsoft Word (registered trademark) generates a series of drawing commands via the OS (Operating System). Upon reception of the drawing commands generated via the OS, a PDL (Printer Description Language) driver 602 generates a print job including a PDL file on the basis of the series of drawing commands, the PDL file being interpretable by the network printers 104 and 105. The PDL driver will be described below by way of example. However, the present invention is not limited to this. The present invention is applicable to, for example, BDL (Band Description Language), a printer driver that generates a compressed bit map, or a form in which print data is generated by the application and OS without using the printer driver.

The PDL driver 602 passes the print job to a spooler 603 in order to transmit it to the print device. Here, the OS is assumed to be Windows (registered trademark), so that the spooler 603 is a Windows (registered trademark) spooler. However, the computer OS to which the present invention is applied is not limited to Windows (registered trademark). The present invention is applicable to other OSs provided that they comprise drawing instructions.

The spooler 603 executes a procedure of passing the print job to a port monitor selected and specified by the user via the user interface and causing the port monitor 604 to transmit the print job to the print device 500 in any of the network printers 104 and 105 (arrow a). Here, the user is assumed to have transferred print data to a job control print service 605 and the specified the port monitor 604 (referred to as a job control port monitor below) for printing.

Print setting information such as a sheet size and staple specification is also transmitted to the job control port monitor 604; the print setting information is set via the printer driver interface. The job control port monitor 604 transmits the information to the print service 605 (referred to as a job control print service) (arrow b).

The job control print service 605 comprises a function for managing the statuses of the transferred print job and device. The job control print service 605 also comprises a function for managing information such as the device and job statuses which is provided by the print device and giving a predetermined instruction to the print device. This corresponds to a function for managing device information and job information for the plurality of network printers 104 and 105.

Before transmitting print data to the print device 500, the job control print service 605 issues a print request to a print job order managing function of the print device 500 (arrow c). In accordance with the order based on the order managing function, the job control print service 605 transmits the print data to the network printer 104 or 105 (arrow e) in response to a print instruction from the print device 500 (arrow d).

Upon confirming that all the print data has been printed, a printer device 606 notifies the job control print service 605 of the completion of printing (arrow f). The printer device 606 also notifies the job control print service 605 of the status of the print device 500 (arrow f). The notification shown by arrow f corresponds to "print status notification" in the sequence diagram in FIG. 12 which will be described below in detail. Further, the notification of start or end of transfer is also transmitted to the print device 500.

A print manager 607 is a program that provides a program that allows the user to check how the print job progresses inside the job control print service 605 and to operate the print job. The print manager 607 transmits information and instructions to and from the job control print service 605 via a software interface (API: Application Program Interface) of the job control print service 605.

The print manager 607 further comprises a function for acquiring, as events, information on the statuses of the network printers 104 and 105 mainly managed by the job control print service 605. Event notifications include notifications of errors/warning information such as a warning for the reduced amount of toner, a difficulty in the communication between the client and the device, the shortage of the memory, a sheet discharging tray filled with sheets, as well as notification of recovery from an error status to a normal status. The job control print service 605 comprises a function for receiving the notification of a status such as a printing status, a power control status, or fault information (paper jam) in a device (print device) that can communicate via the network.

More specifically, the print manager 609 issues an event specifying a device to the job control print service 605. The job control print service 605 recognizes the status of the device on the basis of the issued event. The job control print service 605 then notifies the print manager 609 of a result based on monitoring.

<Flow of Print Job>

Figure 7:
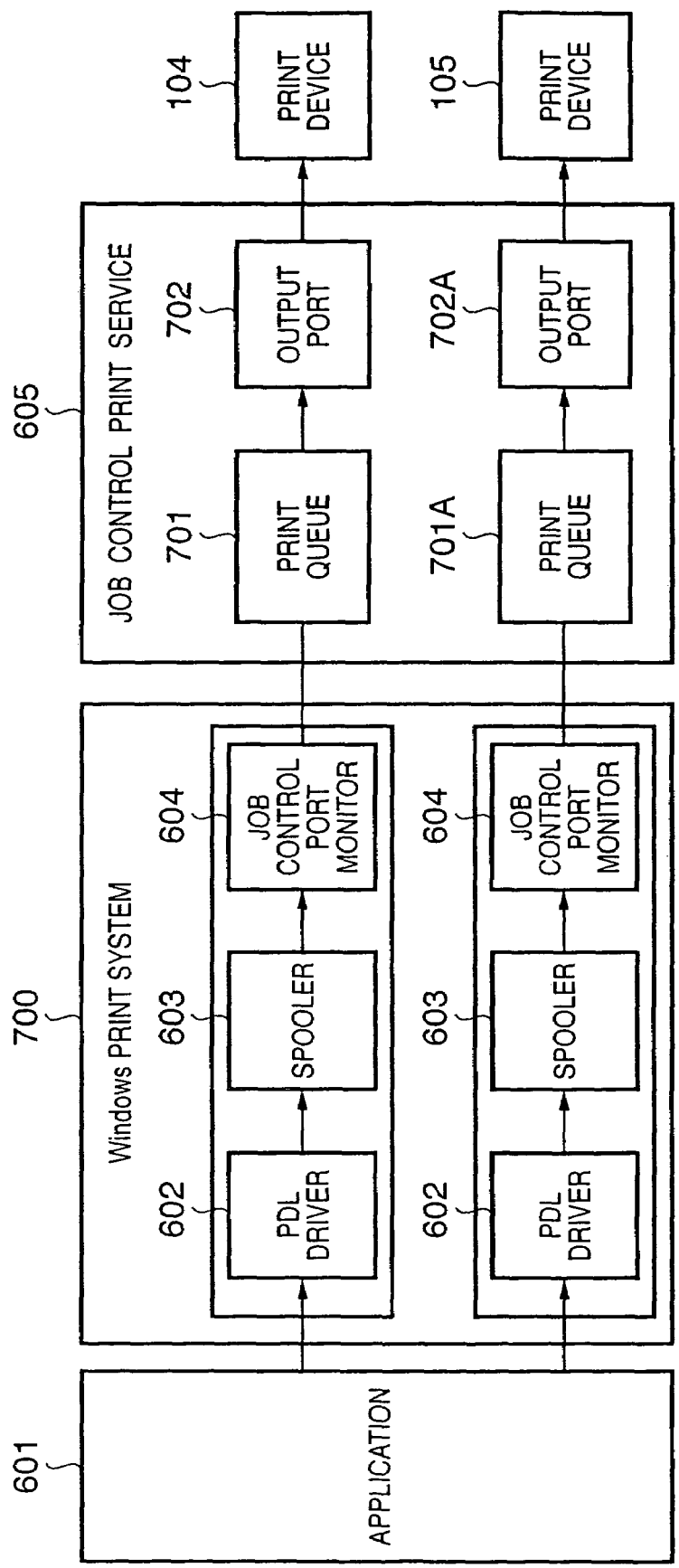
FIG. 7 is a diagram showing the flow of a print job for client's printing.

Now, with reference to FIG. 7, description will be given of the flow of a print job from the application 601 to the print device. In this figure, the same software components as those shown in FIG. 6 have the same reference numerals. Their functions will not be described below in detail. As shown in FIG. 7, the printer driver 602, spooler 603, and job control port monitor 604 are conceptually provided for each of the print devices 104 and 105. If the OS is Windows (registered trade mark), the above components may be collectively called a print system 700.

The job control print service 605 includes a number of print queues 701 and 701A and output ports 702 and 702A the numbers of which correspond to the print devices 104 and 105. The job control print service 605 manages the print queues and output ports 702 and 702A using tables 1801 and 1802, respectively. The print queues are provided in, for example, the spool 205.

The output ports are associated with the IP addresses of the corresponding print devices or names associated with the IP addresses. Then, on the basis of the IP addresses or names, a job schedule request target or job destination is identified and transmission (output) is carried out.

For printing, the application 601 specifies a printer and issues a print instruction to the printer. On the basis of the print instruction, the job control port monitor 604 passes the print job generated by the PDL driver 602, to the job control print service 605. The print job is first held in the print queue 701. The print queue 701 gives an instruction on reception of the print job to an output port 702. Upon reception of the print job, the output port 702 issues a schedule request to a scheduler (described below) in the print device 500 corresponding to the IP address set at the output port. The scheduler in the print device 500 uses its scheduling function to execute a scheduling process on jobs received from the plurality of clients 101 to 103. Then, on the basis of the result of the scheduling process, the scheduler issues a print instruction to the output port 702. Upon reception of the print instruction, the output port 702 transmits the print data to the print device 500.

Description will be given of the following case: a print queue 701 corresponds to a printer for load distribution and a printer queue 701A corresponds to a backup printer for load distribution. A print job thrown into the print queue 701 is registered as a load distribution job. In accordance with the statuses of the print jobs registered in the print queues 701 and 701A, the job control print service 605 assigns the print jobs so that all the load distribution jobs are finished in the shortest time. In this case, in the flow of a print job, the print job thrown into the print queue 701 is moved to the print queue 701A. Further, if for example, an error occurs in the print device, the jobs in the print queue 701A are moved to the print queue 701.

If a plurality of print jobs executed are specified as a group job, the print queue 701 receives all the member jobs belonging to the group job. Subsequently, the output port 702 combines the plurality of member jobs together and issues a scheduling request for the print jobs to the scheduler of the print device 500. The print device 500 then uses its scheduling function to execute a scheduling process on the received group job. The print device 500 then issues a print instruction to the output port 702. Upon reception of the print instruction, the output port 702 transmits each group job including a plurality of jobs, within one session.

<Software Configuration of Printer>

Figure 8:
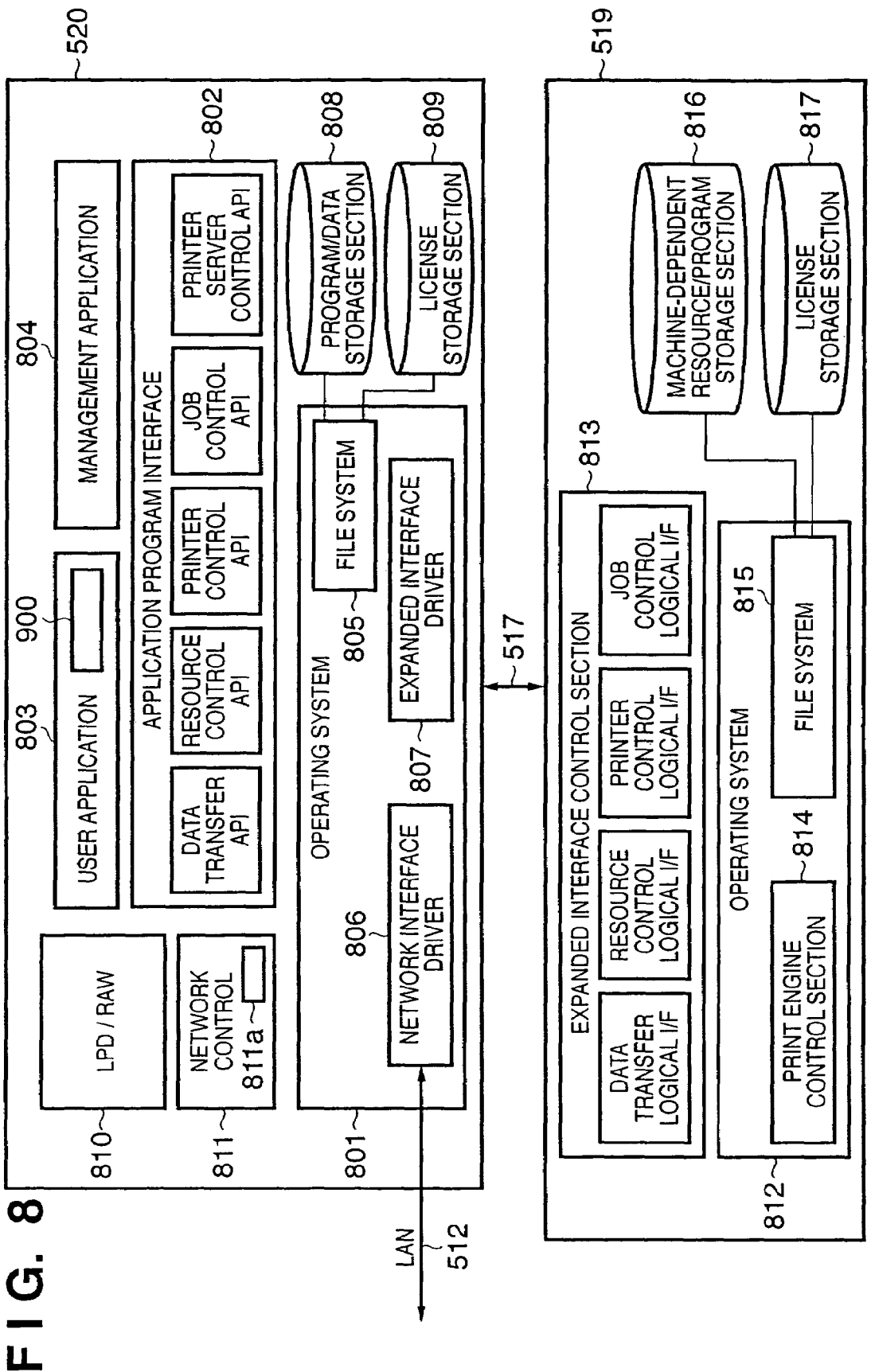
FIG. 8 is a diagram showing an example of the software configuration of a printer.

FIG. 8 is a block diagram illustrating the software configuration of a control program stored in a storage device in each of the network print server 520 and printer controller 519, serving as control units in the printer 500. The control program is loaded into the RAM of the corresponding control unit and executed by the CPU 501 or 508.

An operating system 801 integrally controls basic data inputs to and outputs from the network print server 520. The operating system 801 also contains a file system 805 that controls inputs to and outputs from the program data storage section 509, an expanded interface driver 807 that controls communication via the printer controller 519 and expanded interface 517, and a network interface driver 806 that communicates with an external apparatus such as a host computer (not shown in the drawings) via a communication medium in the local area network (LAN 512).

An application program interface (API). 802 provides various functions of the operating system 801 for application programs such as a user application 803 operating on the network print server 520 and a management application 804 that registers and manages the printer 500 and the user application 803. The application program interface 802 also comprises a data transfer API that provides a function for transmitting and receiving print data, resource control API that controls inputs and outputs of resource data such as bit map images and display messages, a printer control API that performs control, for example, reactivation of the printer 500 and initialization and setting of set values, a job control API that controls, for example, cancellation of a print job and an instruction on re-printing, and a print server control API which reactivates the network print server 520 and which initializes or sets set values, the print server control API activating, registering, and deleting application programs.

An operating system 812 integrates various types of process control performed by the printer controller 519. The operating system 812 contains a print engine control section 814 that controls communication with a print engine and a file system 815. The file system 815 controls inputs to and outputs from a machine-dependent resource/program storage section 816. The machine-dependent resource/program storage section 816 stores, for example, a bit map images referenced by the network print service 520, machine-dependent resources such as error messages, and machine-dependent application programs operating on the network print server.

An expanded interface control section 813 controls communication with the network print server 520 via the expanded interface 517. Moreover, the expanded interface control section 813 comprises logical interfaces including a data transfer logical interface, a resource control logical interface, a printer control logical interface, and a job control logical interface. The data transfer logical interface controls inputs and outputs of print data for each control type. The resource control logical interface controls inputs and outputs of various data stored in the machine-dependent resource/program storage section 816. The printer control logical interface performs control, for example, reactivation of the printer 500 and initialization and setting of set values. The job control logical interface controls, for example, cancellation of a print job and an instruction on re-printing. The expanded interface control section 813 transfers an instruction given by the network print server 520 via the corresponding logical interface, to the operating system 812. The expanded interface control section 813 then returns the result of this processing to the network print server 520.

When the network interface driver 806 receives a notification from any of the clients 101 to 103 via the LAN 512, a network control section 811 receives a notification of the reception. The network control section 811 is a module that can identify a client with which communication is being made and control the communication. The network control section 811 can, for example, discard a packet from a specified IC or MAC address or from a location different from these addresses. To control communication, the network control section 811 can use a table 811a to specify an address to be blocked.

A module 810 controls the protocol according to which the client receives transmitted print data. The module 810 can pass the received print data to the printer controller.

The application 803 is stored in a program storage section 816 of the print controller 519 or in a program storage section 808 of the network print server 520. When activated, the printer 500 determines whether the license of the application stored in the program storage section 808 or 816 matches that of the license storage section 809, program storage section 816, or license storage section 817. If the licenses match, the printer 500 determines that the application program is appropriate. The application program is loaded into the RAM 514 of the network print server 520.

<Device Scheduler 900>

Now, description will be given of the software configuration of a device scheduler 900 that is a user application on the device which has a scheduling function for the present print system and a function for managing print jobs received from the clients 101 to 103. A communication connection managing section 901 manages the connection status of any of the clients 101 to 103 for which printing is to be carried out as well as information of which the client is to be notified. The communication connection managing section 901 uses a client management queue 1001 to manage information 1002 on the connected clients. The communication connection managing section 901 communicates with the clients via the data transfer API of the program application interface 802 and the network interface driver 806. A scheduling managing section 902 schedules the print jobs-received from the clients 101 to 103. The scheduling managing section 902 has a job managing section 903 and a device managing section 904. The job managing section 903 manages scheduling requests issued by the clients 101 to 103 and jobs executed by the clients 101 to 103. The job managing section 903 uses a job management queue 1101 to manage information 1102 on jobs to be executed for the clients. The device managing section 904 receives, via an event handler 905, the statuses of the printers and the received print jobs possessed by the printer controller 519. The device managing section 904 notifies the communication connection managing section 901 and job managing section 903 of the received event.

<Client Management Queue and Job Management Queue>

Figure 9:
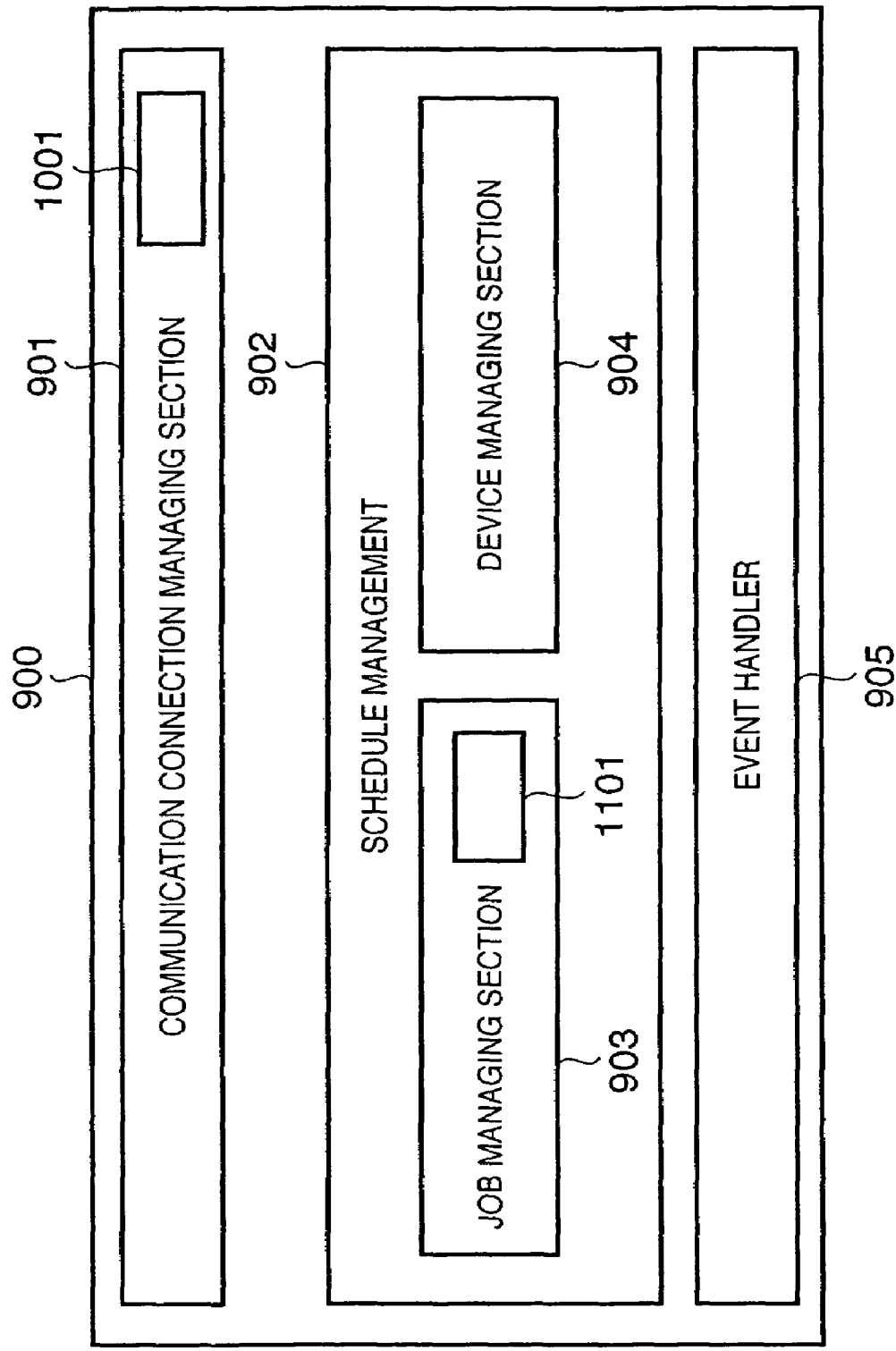
FIG. 9 is a diagram showing an example of the software configuration of a user application in a printer.
Figure 10:
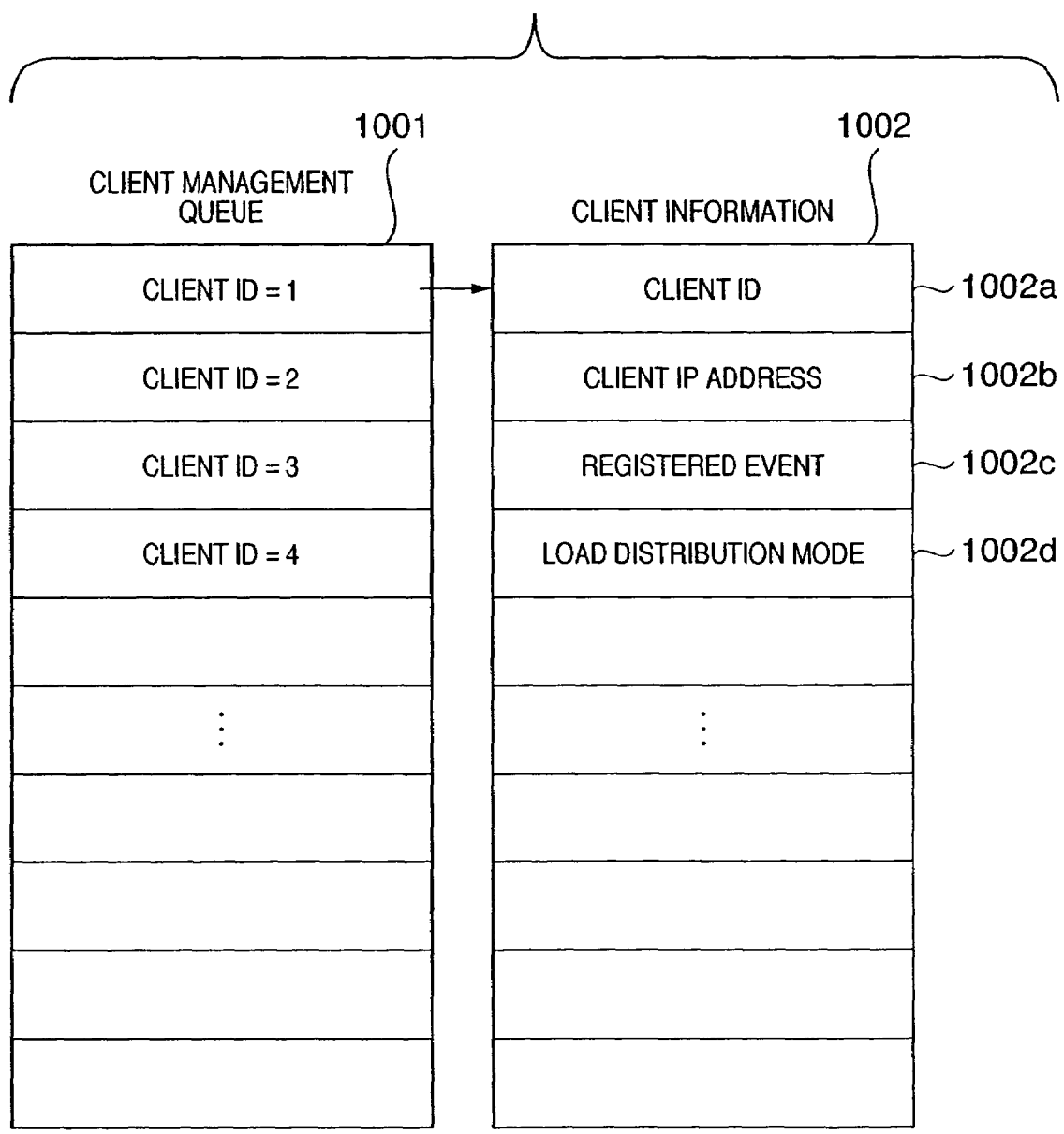
FIG. 10 is a diagram showing client information 1002 and a client management queue 1001 managed by a device scheduler 900.

FIG. 10 shows the client information 1002 on the connected clients 101 to 103 and the client management queue 1001, which manages the client information 1002 on the plurality of connected clients 101 to 103; the communication managing section 901 manages the client information 1002. The client managing queue 1001 is associated with client information corresponding to client IDs. FIG. 9 shows the communication connection managing section 901 inside the device scheduler. However, of course, the communication connection managing section 901 is desirably an independent table.

The client information 1002 includes a client ID 1002a assigned to each connected client by the connection managing section, the IP address 1002b of each of the connected clients 101 to 103, and registered event information 1002c indicative of the type of an event registered by the connected client. A load distribution mode 1002d is set to occupy the network printer so that the clients 101 to 103 can use a plurality of devices to efficiently execute a large number of print jobs. The load distribution mode 1002d is information set when the client is connected as described below. The printer controller notifies the client of the event of the type specified by the registered event information, for example, the event of the device or job status.

The client management queue 1001 retains the client information on the connected clients 101 to 103 in queue form. When a session with a client is started, the information on the client is registered in the client management queue 1001. When the session is disconnected, the registered client information is deleted from the client management queue 1001. In FIG. 10, the client management queue 1001 and the client information 1002 are linked using a pointer of the client management queue 1001. Of course, the client information 1002 may be registered in records in the client management queue 1001. This also applies to the job management queue.

Figure 11:
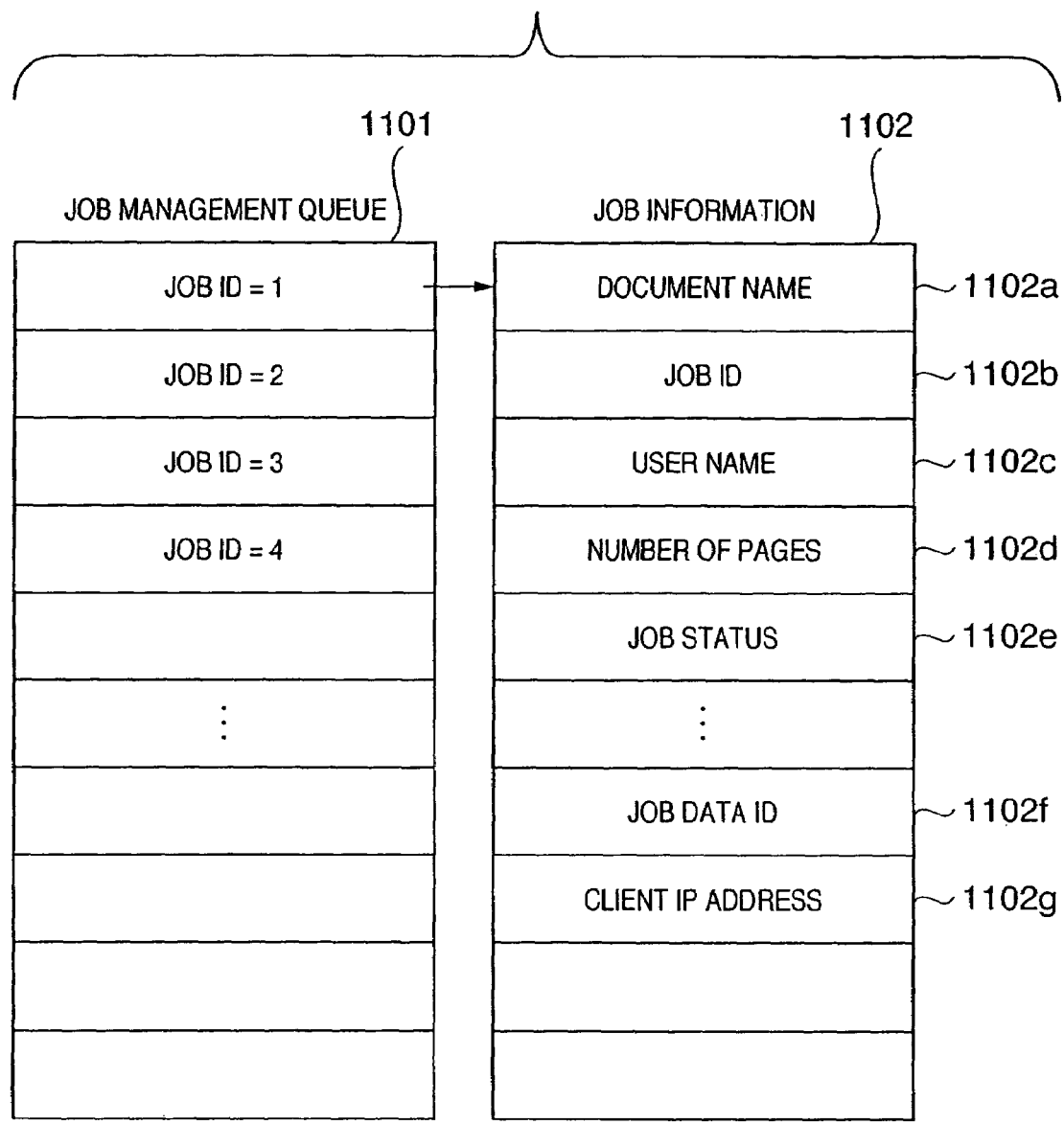
FIG. 11 is a diagram showing job information 1102 and job management queue 1101 managed by a device scheduler 900.

FIG. 11 is a diagram showing job information 1102 added to scheduling requests issued by the clients 101 to 103 and a job management queue 1101 that manages plural pieces of lob information generated. The job management queue 1101 is associated with job information associated with job IDs.

The job information 1102 is on print jobs and is added to scheduling requests issued by the clients 101 to 103 in order to start printing. The following are registered in the job information 1102: a document name 1102a for the print job, a job ID 1102b issued by the job managing section 903, the name 1102c of a user who has started printing at the client, the number of pages 1102d printed by the print job, a job status 1102e representative of the status of the print job, a job data ID 1102f contained in the print data transferred by any of the clients 101 to 103, and the IP address 1102g of the client that has transmitted the print job. The job status 1102e indicates the status from issuance of a print scheduling request by any of the clients 101 to 103 until the elimination of the print job from the printer. The job status 1102e includes a print standby status, a schedule up status, a transfer in operation status, a transfer completed status, and a print completed status. The job data ID is the ID of the job contained in the print data. The job data ID is added to the data when for example, the client is notified of the job status in the printer controller 519.

The job management queue 1101 manages plural pieces of job information 1102. When a scheduling request is received from any of the clients 101 to 103, the job information 1102 is registered in the job management queue. Once the print job is finished, the corresponding printer information is deleted from the job management queue 1101.

<Sequence of Schedule Job>

Figure 12:
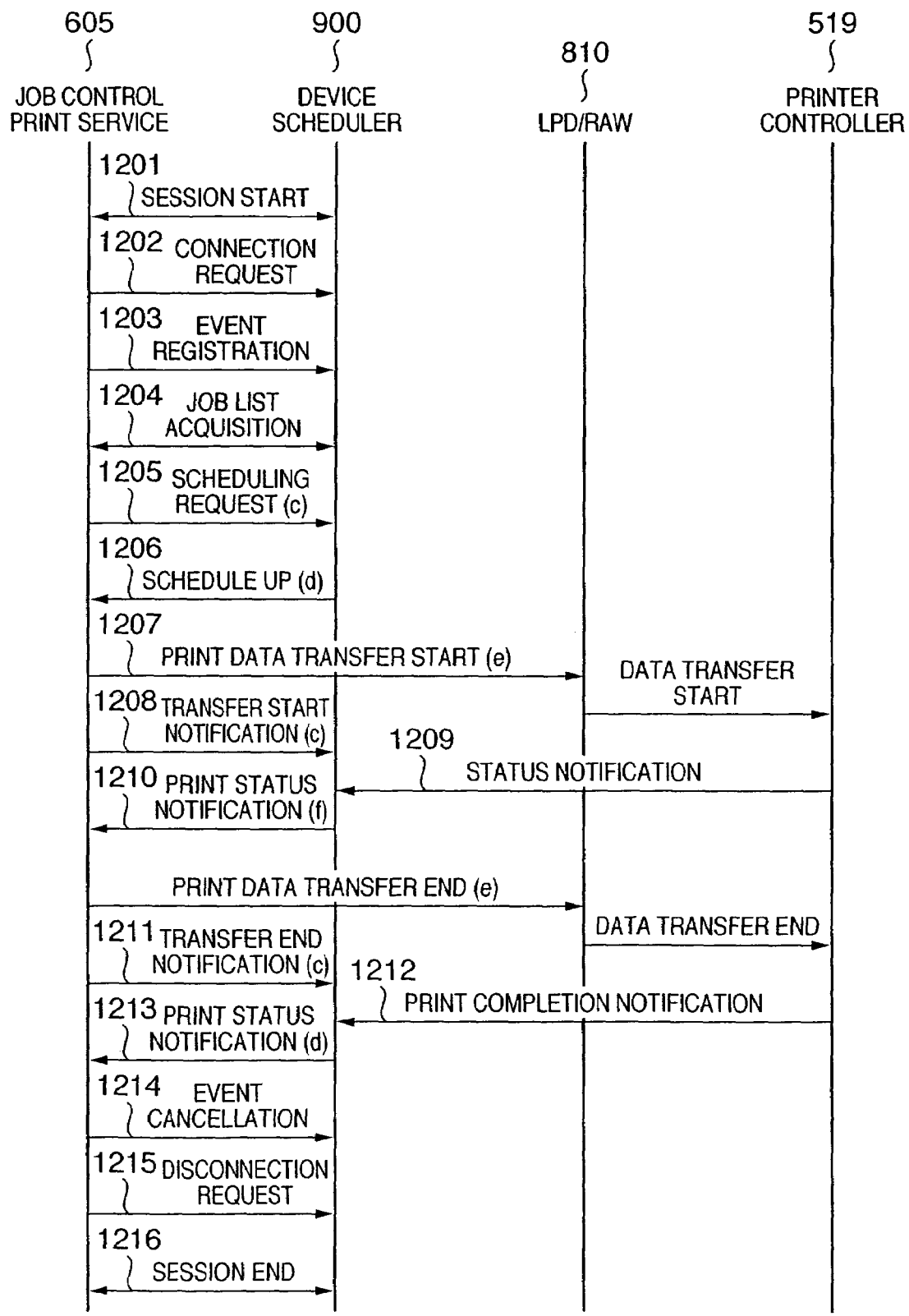
FIG. 12 is a diagram showing a print sequence used between a job control print service and a device scheduler 900, an LPD/RAW, and a printer controller.

FIG. 12 shows a message sequence from issuance of a scheduling request to the print device 500 by the job control print service 605 in any of the clients 101 to 103 which has received a print job until the printer finishes printing. The alphabets in parentheses added to the messages in FIG. 12 corresponds to the reference characters for the messages between the job control print service 605 and print device 500 in FIG. 6. In the description below, the client corresponds to the job control print service 605 in FIG. 12.

Upon receiving print data, the job control print service 605 starts a session connection with the device scheduler 900 (1201). The job control print service 605 issues a connection request command (1202) that provides information on the client, even registration (1203) used to notify the client of the job and device statuses, and a job list acquisition command (1204) used to acquire information on the jobs the schedule for which is managed by the device scheduler 900. Upon reception of the connection request, the device scheduler 900 registers the client information 1002 in the client management queue 1001. Upon reception of an event registration, the job control print service 605 sets the specified event in the registered event information in the corresponding client information. Upon reception of a job list request, the job control print service 605 transmits a list of the job information 1102 registered in the job management queue 1101.

The corresponding one of the clients 101 to 103 issues a scheduling request command (1205) in order to reserve printing. Upon reception of the scheduling request (1205), the device scheduler 900 registers the job information 1102 in the job management queue 1101. Information such as the document name is set in the job information 1102. Upon determining that the printer device 500 can receive the print data as described below, the device scheduler 900 issues the schedule up status (1206) to urge the job control print service 605 to start transmitting the print data. Upon issuing the schedule up signal, the device scheduler 900 updates the job status in the job information 1102 to the schedule up status.

Upon reception of the schedule up status, the job control print service 605 starts transferring print data to an LPD (daemon that controls the flow of a print job to the printer)/ RAW 810 (1207). When the transfer is started, the job control print service 605 notifies the device scheduler 900 of the start of the transfer (1208). Upon reception of the transfer start notification, the device scheduler 900 updates the job status of the job information 1102 to "transfer in operation". Upon reception of the print data, the LPD/RAW 810 transfers the data to the printer controller 519. Upon receiving the data, the printer controller 519 starts printing. When printing is started, the printer controller 519 notifies the device scheduler 900 of the job status (1209). The device scheduler 900 notifies the client of a job print state on the basis of the information on the registered event in the client information (1210).

When transfer of print data is finished, the job control print service 605 transmits a transfer end notification to the device scheduler 900 (1211). Upon reception of the transfer end notification, the device scheduler 900 updates the job status in the job information 1102 to the transfer completed status.

Upon finishing the print process, the printer controller 519 notifies the device scheduler 900 of completion of printing as a job status (1212). The device scheduler 900 notifies the client of completion of the job print on the basis of the information on the registered event in the client information (1213). Upon confirming from the print completion notification that printing has been completed, the job control print service 605 issues a request for cancellation of event notification registration to the device scheduler 900 (1214) because the notification from the device is no longer required. Upon reception of the event cancellation request, the device scheduler 900 sets, in the registered event information contained in the client information, information indicating that the client is not to be notified of the event the registration of which has been cancelled. Subsequently, the job control print service 605 issues a disconnection request used to end the connection with the device scheduler 900 (1215). The session is thus ended (1216).

Upon reception of the disconnection request, the device scheduler 900 deletes the corresponding client information 1002 from the client management queue 1001 to end the process for the client.

<Process Procedure Executed by Schedule Managing Section 902>

Figure 13:
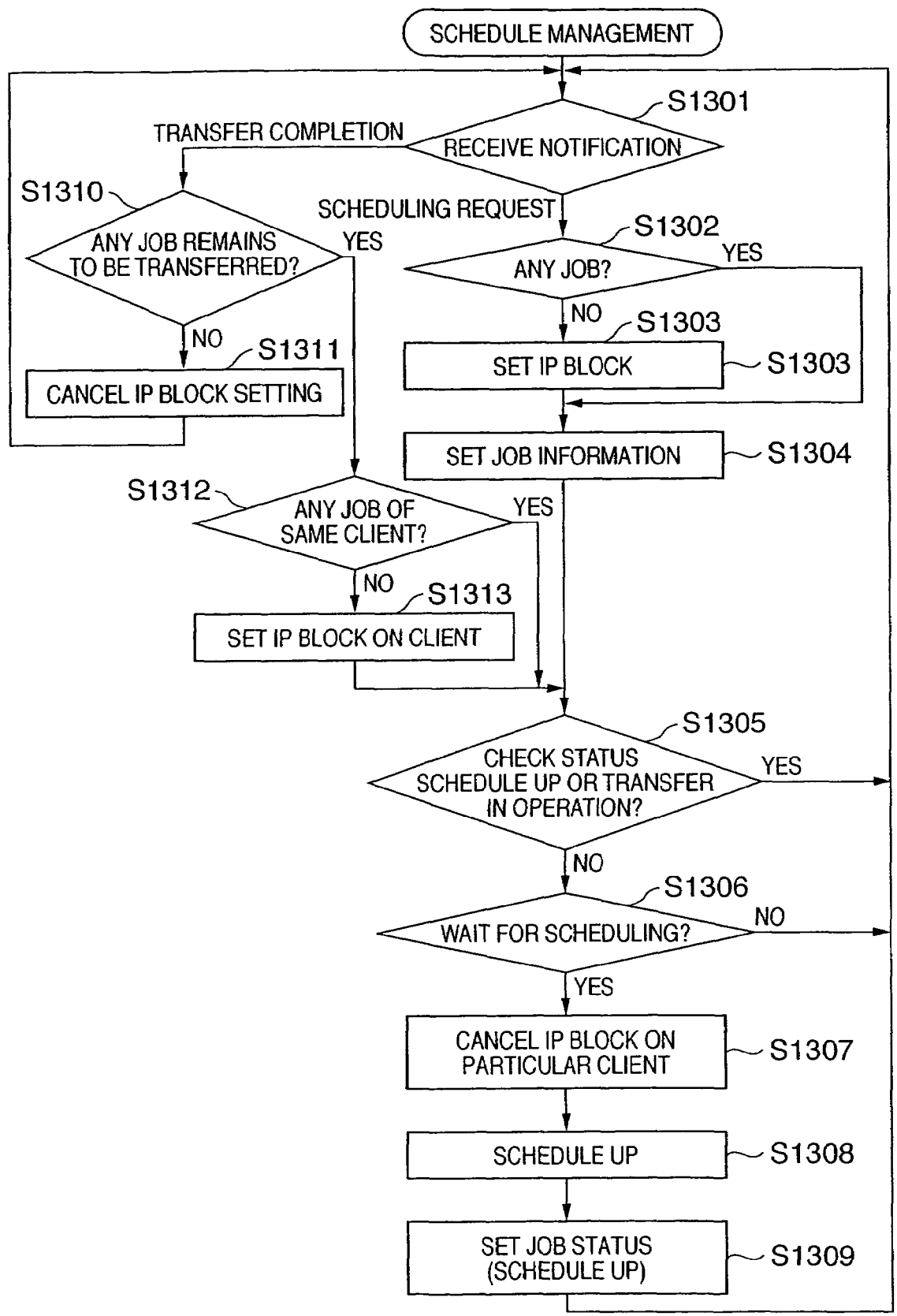
FIG. 13 is a flowchart showing the flow of processing executed by a schedule managing section of the device scheduler and starting from reception of a scheduling request for a job control print service and going to issuance of a schedule up status.

With reference to FIG. 13, description will be given of a process executed when if a print control device comprising managing means for managing a print scheduling request from an information processing apparatus (corresponding to the network printer server 520) prevents reception of print data not based on the scheduling request if the scheduling request is already registered in the managing means (corresponding to the schedule managing section 902). FIG. 13 is a flowchart of a process executed by the schedule managing section of the device scheduler and starting from reception of a scheduling request from the job control print service 605 and going to issuance of the schedule up status. Here, description will also be given of a process executed if the device scheduler 900 is executing scheduling or if the client specifies job grouping so that a plurality of print jobs are combined and output for printing, for preventing another client from interrupting scheduled print jobs for printing. The "another client" does not have the job control print service 605 and cannot use the scheduling function of the device scheduler 900. When such a client transfers print data directly to the LPD/RAW, the interruption of print jobs occurs in the conventional art. The port number of the destination or the like can be used to specify whether the destination is to be the schedule managing section 902 or the LPD/RAW.

In FIG. 13, in step S1301, upon reception of a notification from the job control print service 605, the schedule managing section 902 determines whether the notification is for a scheduling request or the transfer completed status as shown in FIG. 12.

If the notification is for a scheduling request, the schedule managing section 902 shifts the processing to step S1302 to determine whether or not any job is under schedule management, with reference to the job management queue 1101. If no job is under schedule management, the schedule managing section 902 shifts the processing to step S1303. The schedule managing section 902 instructs the network control section 811 to make an IP block setting that rejects the connections from all the IP addresses, thus preventing all the clients from carrying out printing. The network control section 811 uses a connection reject signal to respond to print requests from the IP addresses (that is, in this case, all the IP addresses) for which the IP block setting has been made.

In other words, for input data destined for the port corresponding to the LPD/RAW, the print control device rejects uses the IP block setting to reject the input of print data from any devices except the client. On the other hand, the print control device does not reject the input of input data destined for the port corresponding to the scheduling request.

If the schedule managing section 902 determines in step S1302 that any job has already been scheduled, it shifts the processing to step S1304. If the device scheduler 900 is executing scheduling, the above processing prevents a client from transferring print data directly to the LPD/RAW without asking the device scheduler 900 to reserve printing for the client. If the device scheduler 900 is not executing scheduling, the above processing can permit the client to transfer the print data directly to the LPD/RAW without asking the device scheduler 900 to reserve printing for the client.

In step S1304, the schedule managing section 902 creates job information 1102 for which the job ID issued by the job managing section 903 is set. The schedule managing section 902 sets the information added to the scheduling request in the job information 1102. The schedule managing section 902 then registers the schedule request in the job management queue 1101 in accordance with the order of request reception.

In step S1305, the schedule managing section 902 checks the job information 1102 registered in the job management queue 1101, for the job status. If any print job has the schedule up status or the transfer in operation status, then an instruction has already been issued to this print job, the instruction requesting the client to transfer the print data. Thus, the schedule managing section 902 shifts the processing to step S1301. Thus, if no job has the schedule up status or transfer in operation status, none of the clients 101 to 103 are scheduled to transmit print data and the printer can receive print data. Thus, the schedule managing section 902 shifts the processing to step S1306 to get ready to issue the schedule up status.

In step S1306, the schedule managing section 902 sequentially checks the print jobs registered in the job management queue 1101 starting from the leading one to determine whether or not any print job is waiting for scheduling. If none of the print jobs are waiting for scheduling, no print jobs require a transmission instruction (that is, schedule up message) to be issued. If any job is waiting for scheduling, the schedule managing section 902 shifts the processing to step S1307. In step S1307, the schedule up status is to be issued to the print job waiting for scheduling. Thus, to allow the reception of print data from the client having requested the print job to be reserved, the IP block on the IP address of the client must be cancelled. To accomplish this, the schedule managing section 902 instructs the network control 811 to cancel the IP block on the IP address of the corresponding client. The IP address of the client is registered in the client management queue 1001 or job management queue 1101 as the IP address of the client, it can be found using either the job ID or the client ID.

Moreover, in step S1308, the schedule managing section 902 provides the corresponding client with a schedule up command allowing the client to start transferring the print data. In step S1309, the schedule managing section 902 updates the job status in the corresponding job information 1102 to the schedule up status. The schedule managing section 902 then shifts the processing to step S1301.

On the other hand, in step S1301, the schedule managing section 902 receives a notification from the job control print service 605. If the notification indicates that the transfer has been completed, it means that the client with the schedule up status has finished transferring the print data. Thus, the schedule managing section 902 shifts the processing to step S1310 in order to block the IP address of the client.

The schedule managing section 902 determines whether or not any job for which scheduling has been requested and for which print data has not been transferred remains in the job management queue 1101 in step S1310. Since the device was notified of the print job to be scheduled during the scheduling request, the determination in step S1310 can be made on the basis of the transmitted job information. If no print job remains for which print job is to be transferred, the schedule managing section 902 cancels the setting for IP block in step S1311. Thus, the schedule managing section 902 permits the reception of data from the IP addresses corresponding to all the clients. Thus, the schedule managing section 902 instructs the network control 811 to cancel the setting for IP block. The schedule managing section 902 then shifts the processing to step S1301.

If the schedule managing section 902 determines in step S1310 that there is a job which has been scheduled but which has not been transferred, it branches to step S1312. In step S1312, the schedule managing section 902 determines whether or not the client that has transmitted the "transfer completed" status (that is, transfer completion notification) sensed in step S1301 has a job for which scheduling has been requested but which has not been transferred. That is, the schedule managing section 902 determines whether the source of the "transfer completed" status is the same as the source of the job which has been scheduled but has not been transferred. If these sources are not determined to be the same, the client that has requested scheduling will not transfer any print data. Thus, the schedule managing section 902 shifts the processing to step S1313. In order to prevent printing from the client having requested scheduling, the schedule managing section 902 then instructs the network control 811 to make an IP block setting in order to avoid receiving printing from the IP address of the client. The schedule managing section 902 then shifts the processing to step S1305.

On the other hand, if the schedule managing section 902 determines in step S1312 that the client that has transmitted the "transfer completed" status has a job for which scheduling has been requested but which has not been transferred, it shifts the processing to step S1305 without setting IP block (without changing the settings).

Even if a certain client is carrying out printing after using the device scheduling function to specify normal job printing or a group job, the above processing can prevent a client from transferring print data directly to the LPD/RAW and interrupting scheduled jobs for printing without using the scheduling function of the device scheduler 900.

<Processing by Device Managing Section>

Figure 14:
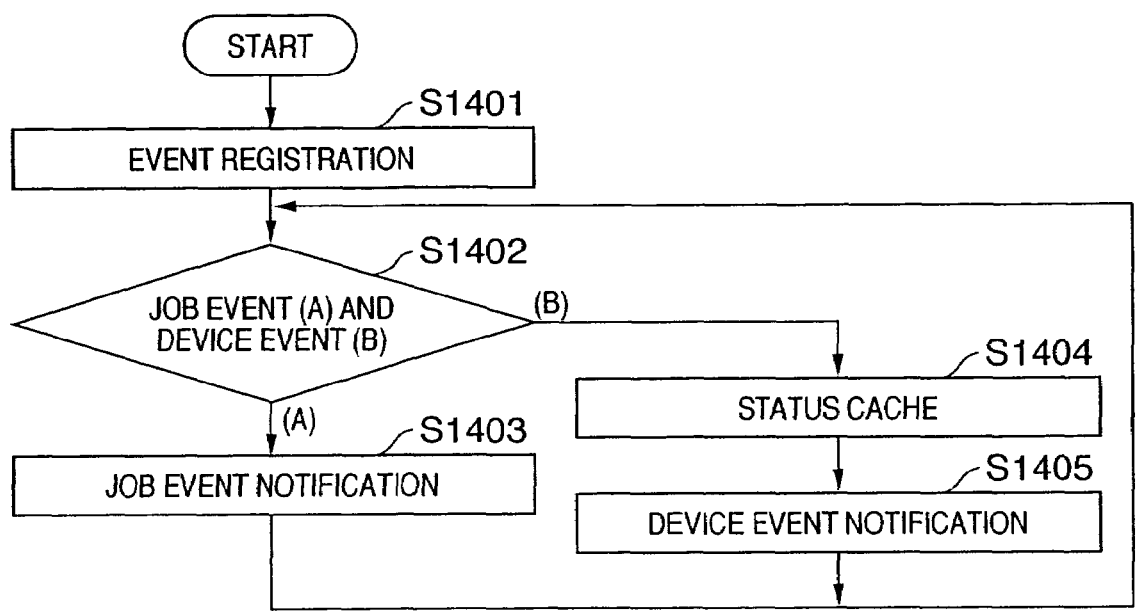
FIG. 14 is a flowchart showing processing executed by a job managing section 903 upon reception of a job status notification event and upon reception of a job list request.

FIG. 14 illustrates processing executed by the device managing section 904 to receive the device and job status notifications from the printer controller via the event handler and notifying the job managing section 903 and communication connection managing section 901 of the device and job statuses.

In step S1401, when the device scheduler 900 is activated, the device managing section 904 executes an event registering process. If the device status or the status of the print job processed by the printer controller is changed in accordance with the registered event information, the device managing section 904 notifies the printer controller of the status via the event handler. In step S1402, when-receiving an event generated by the printer controller, the device managing section 904 determines whether the event is for a job or a device. If the event is for a job, then in step S1403, the device managing section 904 notifies the job managing section 903 of the job event and shifts the processing to step S1402. If the event is for a device, the device managing section 904 shifts the processing to step S1404 to retain the device status. Then, in step S1405, the device managing section 904 notifies the communication connection managing section 901 of the device event. The device managing section 904 shifts the processing to step S1402.

<Processing by Job Managing Section>

Figure 15:
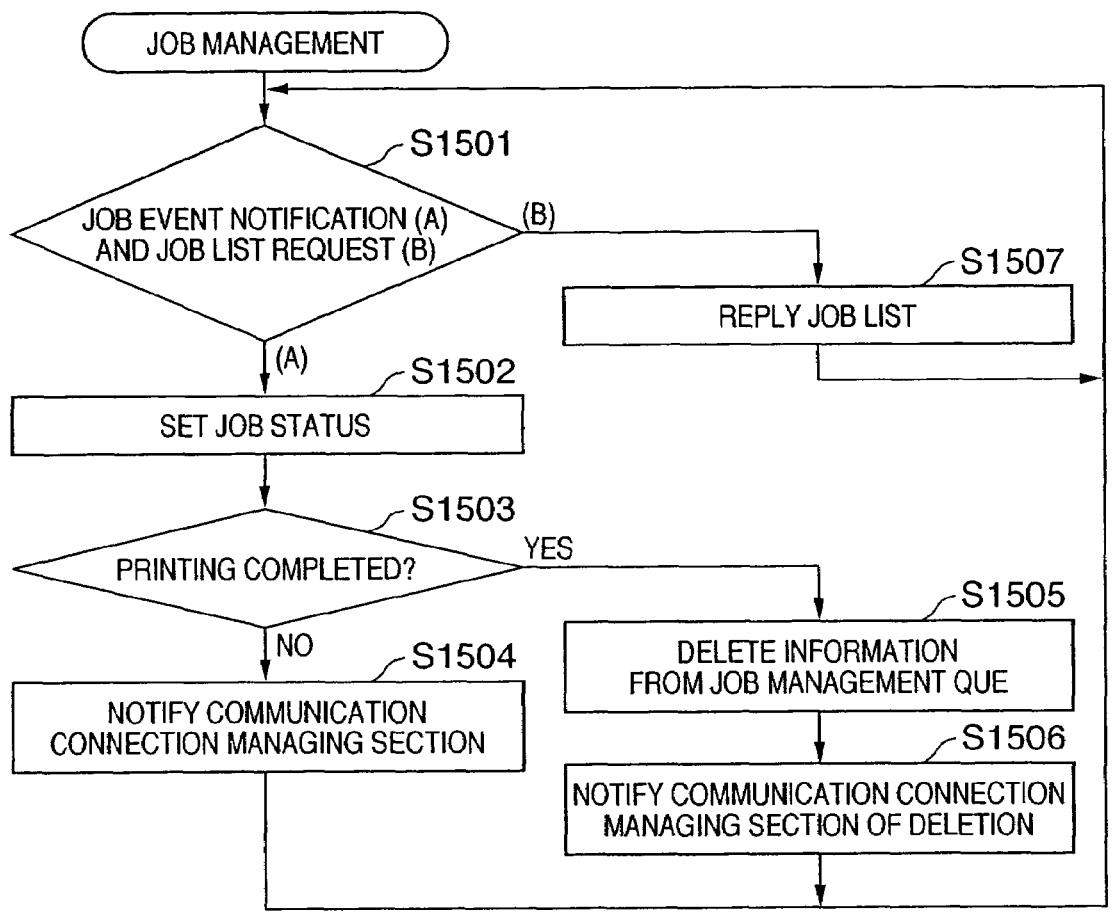
FIG. 15 is a flowchart showing processing executed by a device managing section upon reception of a device and job status notification from a printer controller.

FIG. 15 shows processing executed by the job managing section 903 upon receiving a job status notification event from the device managing section 904 or receiving a job list request from the job control print service 605. In step S1501, upon reception of a notification from the communication connection managing section 901 or device managing section 904, the job managing section 903 determines whether the notification is a job status notification provided by the device managing section 904 or a job list request. If the notification is the job status notification provided by the device managing section 904, the job managing section 903 shifts the processing to step S1503 to determine whether or not the notification is for print completion. If the notification is not for print completion, the job managing section 903 shifts the processing to step S1504 to request the communication connection managing section 901 to issue a job status event to the client.

If the job managing section 903 determines that the notification is for print completion in step S1503, it shifts the processing to step S1505 to delete the corresponding job information from the job management queue 1101. In step S1506, the job managing section 903 requests the communication connection managing section 901 to issue a job completion event (deletion notification) to the client to shift the processing to step S1501.

After receiving the job list request from the job control print service 605 in step S1501, the job managing section 903 provides, in step S1507, the communication connection managing section 901 with the list of the job information 1102 registered in the job management queue 1101 so that the communication connection managing section 901 can transmit the list of the job information 1102 to the requesting client.

As described above, the client (job management print service) can be notified of the job status. Further, the job management queue can be updated in accordance with the job status.

<Processing by Communication Connection Managing Section>

Figure 16:
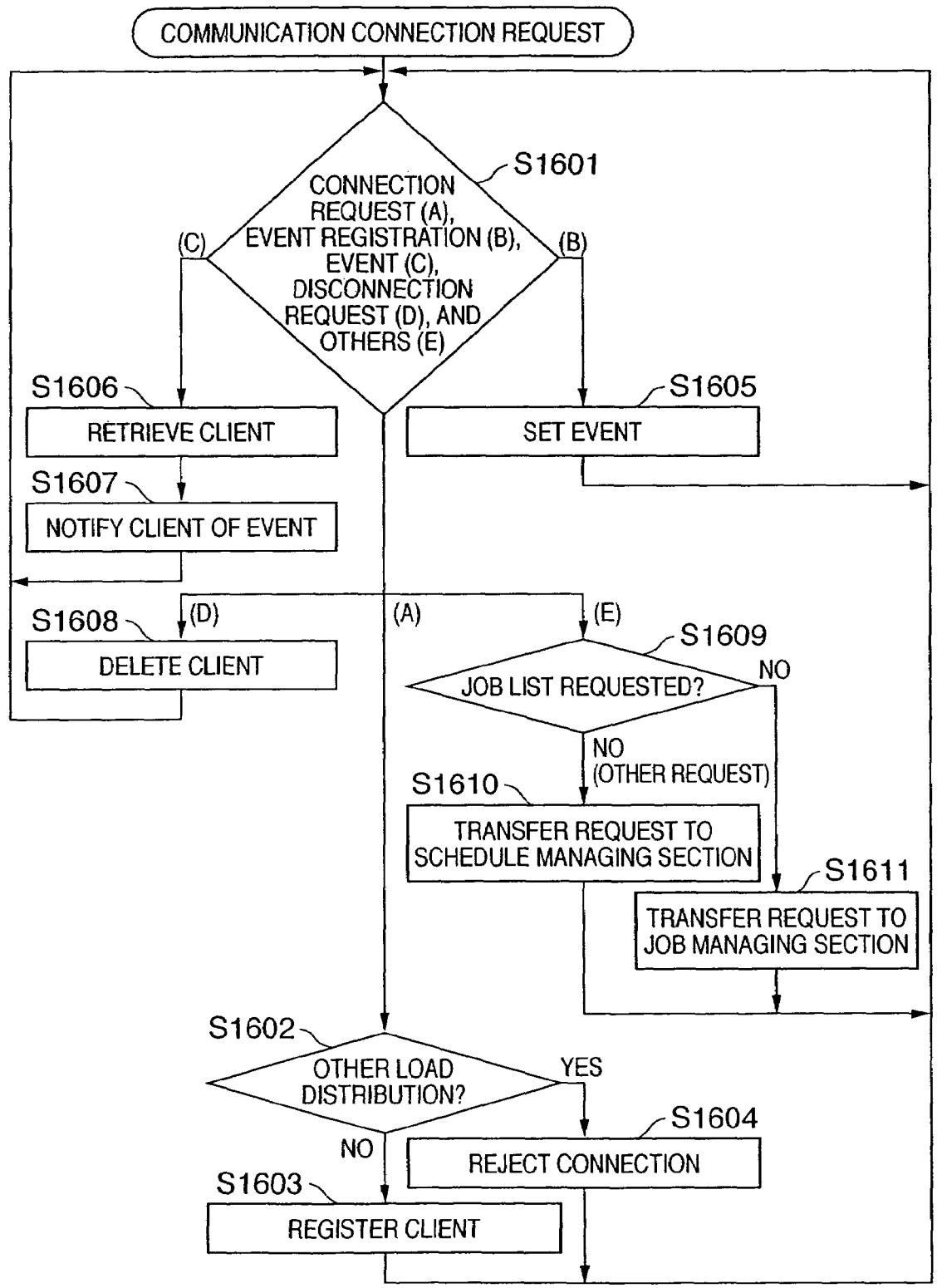
FIG. 16 is a flowchart showing processing executed by a communication connection managing section 901 that processes requests and notifications from a client, notifications from the device managing section, and requests and notifications to the job managing section 903.

FIG. 16 illustrates the flow of processing executed by the communication connection managing section 901 on a request or notification from any of the clients 101 to 103, a notification from the device managing section 904, and a request or notification to job managing section 903 and communication connection managing section 901, respectively. The figure also illustrates the flow of processing in which if a client specifies load distribution for printing in order to efficiently execute a large number of jobs using a plurality of print devices, the device scheduler 900 rejects print requests from other clients.

In step S1601, the communication connection managing section 901 receives a notification or request from any of the clients 101 to 103, device managing section 904, or job managing section 903. The communication connection managing section 901 then determines what notification or request it is. If the request or event received in step S1601 is a connection request from any of the clients 101 to 103, the processing shifts to step S1602.

In step S1602, the communication connection managing section 901 references the load distribution mode in the client information 1002 registered in the client management queue 1001, which manages the connections with the clients. The communication connection managing section 901 thus checks whether or not any client different from the one having issued the connection request in step S1601 is carrying out load distribution mode printing. If no client is carrying out load distribution mode printing, the communication connection managing section 901 shifts the processing to step S1603. In step 1603, the client ID issued by the communication connection managing section 901 and the IP address of the client having issued the request are registered, with the client information 1002 registered in the client management queue 1001. In step S1602, if there is a connection with a client which is different from the one having issued the connection request in step S1601 and which is in the load distribution mode, the communication connection managing section 901 shifts the processing to step S1604 to reject the connection request to suspend the connection.

With this processing, after a client executing a load distribution printing process establishes a connection and before this client is disconnected, the other clients cannot establish any connections. Further, as shown in FIG. 13, the IP block setting is made so that only the job from the client scheduled by the device scheduler 900 can be executed. Accordingly, while a client is carrying out load distribution processing, the other clients cannot interrupt this processing for printing. This enables the load distribution printing process to be efficiently executed.

If the request or event received in step S1601 is an event notification from any of the clients 101 to 103, the communication connection managing section 901 shifts the processing to step S1605 to set an event type to be transmitted, in the registered event in the corresponding client information. The event type includes a job event indicative of a change in job status or a device event indicative of a change in device status.

If the request or event received in step S1601 is a device event from the device managing section 904 or a job event from the job managing section 903, the communication connection managing section 901 proceeds to step S1606 to determine the client to be notified of this event. In step S1606, the communication connection managing section 901 references the setting for the registered event in all the client information 1002 registered in the client management queue 1001, to retrieve the client to be notified of the event. If any client is determined to be notified of the event, the communication connection managing section 901 retains the IP address of the client. In step S1607, the communication connection managing section 901 transmits the event to all the clients to be notified of the event.

If the request or event received in step S1601 is a disconnection request from any client, the communication connection managing section 901 shifts the processing to step S1608 to delete the client information 1002 on the corresponding client from the client management queue 1001.

If the request or event received in step S1601 is another request from any client, the communication connection managing section 901 shifts the processing to step S1609 to determine whether or not it is a job list request. If it is a job list request, the communication connection managing section 901 passes the request to the job managing section 903. If it is not a job list request, the communication connection managing section 901 passes the request to the schedule managing section 902.

<Processing by Job Control Print Service>

Figure 17:
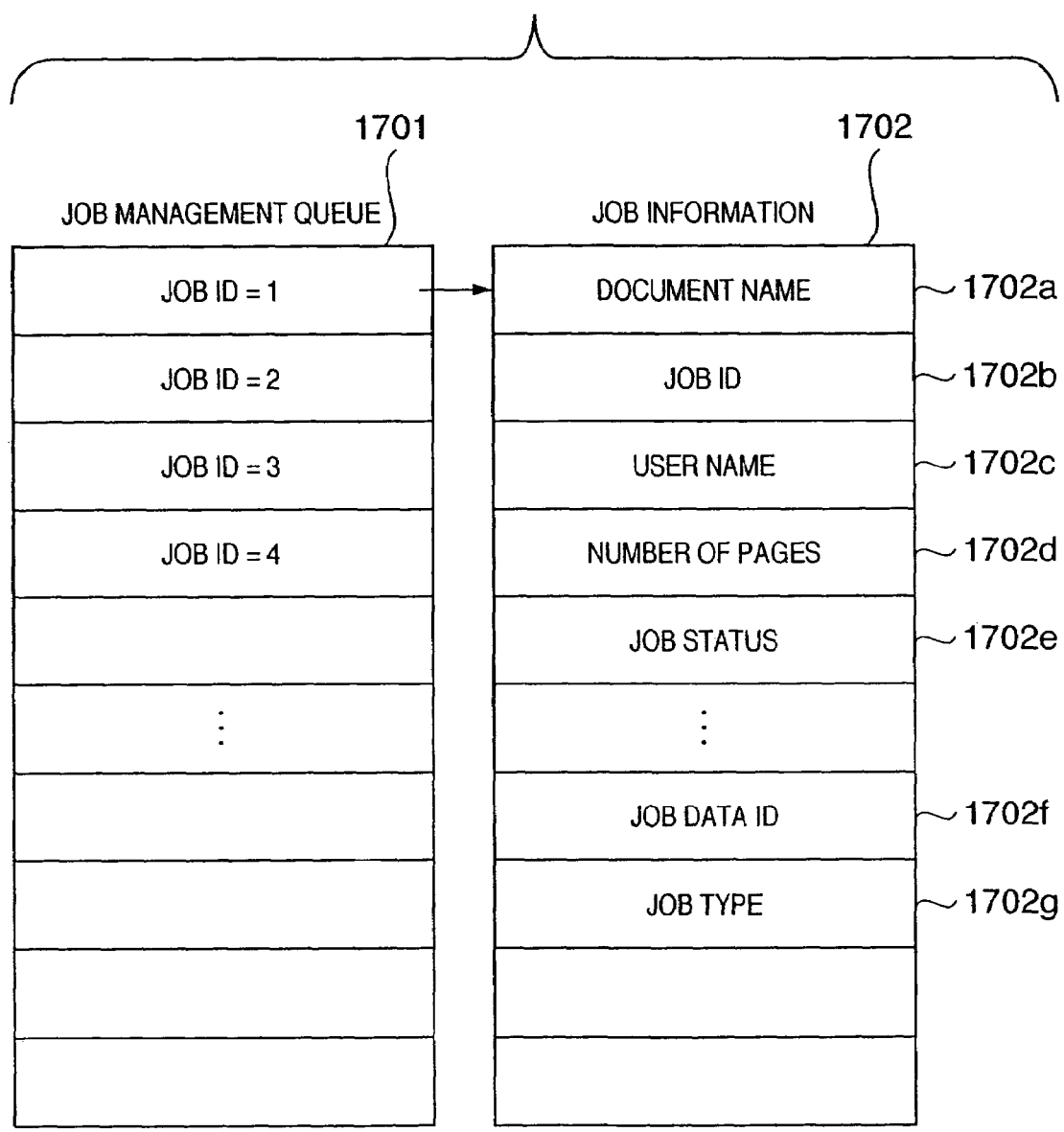
FIG. 17 is a diagram showing the print job information and job management queue managed by the job control print service.

FIG. 17 illustrates information on the print jobs managed by the job control print service 605 of a certain client and a job management queue 1701 that manages plural pieces of job information 1702. The job information 1702 is information on the print job issued by the client managing the job information as well as job information on the print jobs of the other clients which information is provided by the device scheduler 900 in accordance with the event generated and registered event information 1002c. The job information 1702 includes a document name 1702a for a print job, a job ID 1702b, the name 1702c of a user having started printing at any of the clients 101 to 103, the number 1702d of pages for the job, a job status 1702e indicative of the status of the print job, a job data ID 1702f contained in print data, and a job type 1702g used to determine whether the job is of a load distribution type, a group job type, or a normal type. The job status 1702e indicates the status of the job from the start of printing by any of the clients 101 to 103 until the elimination of the job from the printer. The job status 1702e includes a spool in operation status, a print standby status, a schedule up status, a transfer in operation status, a transfer completed status, or a print completed status. The job data ID 1702f is the ID of a job contained in the print data and is set in a job event from the device scheduler 900.

The management queue 1701 manages plural pieces of job information 1702. The job information on the job executed by the client and the job information 1702 on the other clients provided by the device scheduler 900 are registered in the management queue 1701.

Figure 18:
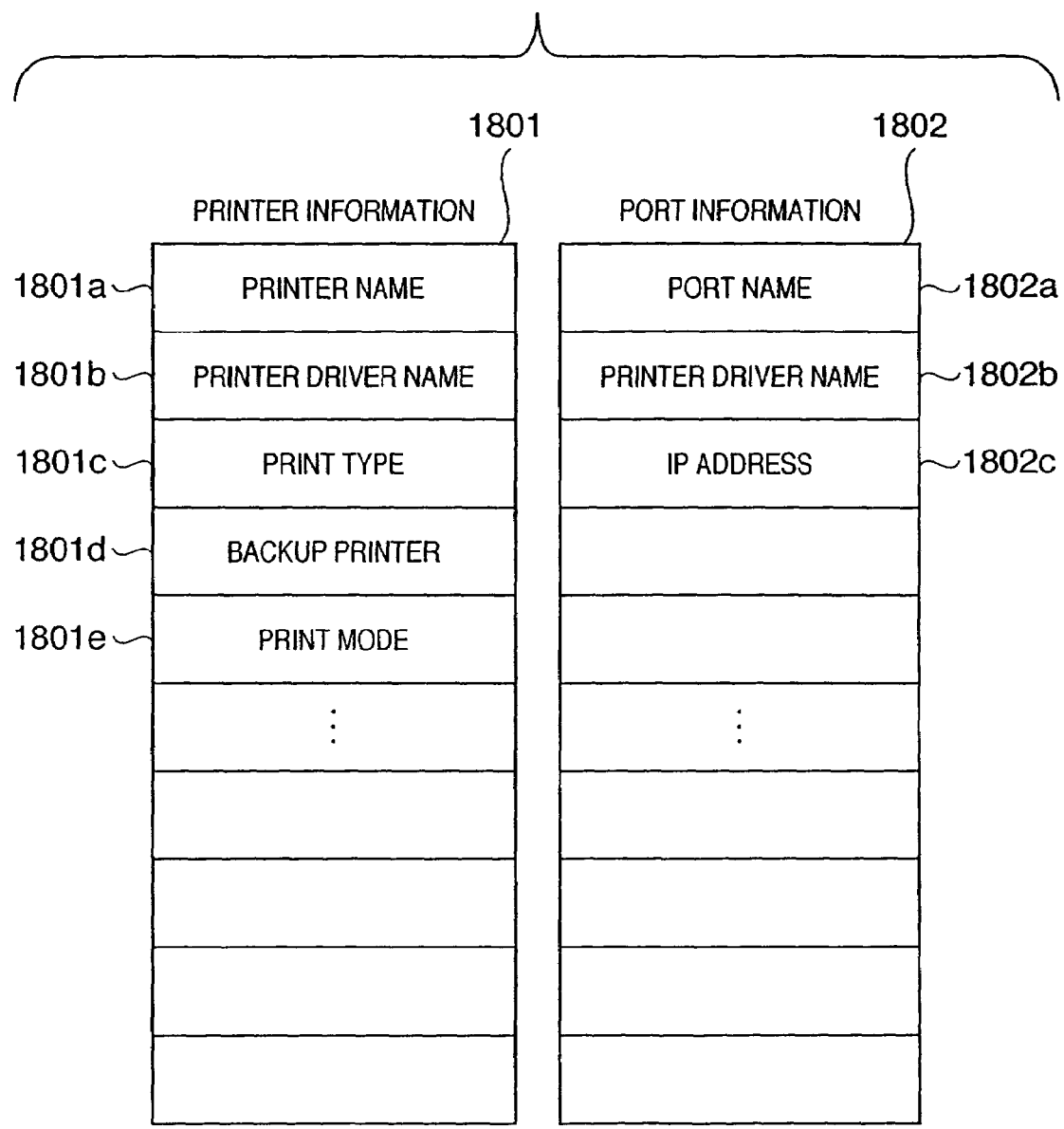
FIG. 18 is a diagram showing information on a printer queue and an output port managed by the job control print service.

FIG. 18 illustrates printer information 1801 and output port information 1802 managed by job control print service 605. The printer information 1801 indicates information on each printer queue managed by the job control print service. The printer information 1801 includes a printer name 1801a, a printer driver name 1801b, a print type 1801c indicating whether or not the printer is set for load distribution, a setting 1801d for a backup printer for load distribution printing, and a print mode 1801e in which a group job is executed. The port information 1802 indicates information on each output port managed by the job control print service 605. The port information 1802 includes the name 1802a of the port for the printing device, a driver name 1802b, and an IP address 1802c.

<Processing by Job Control Print Service>

Figure 19:
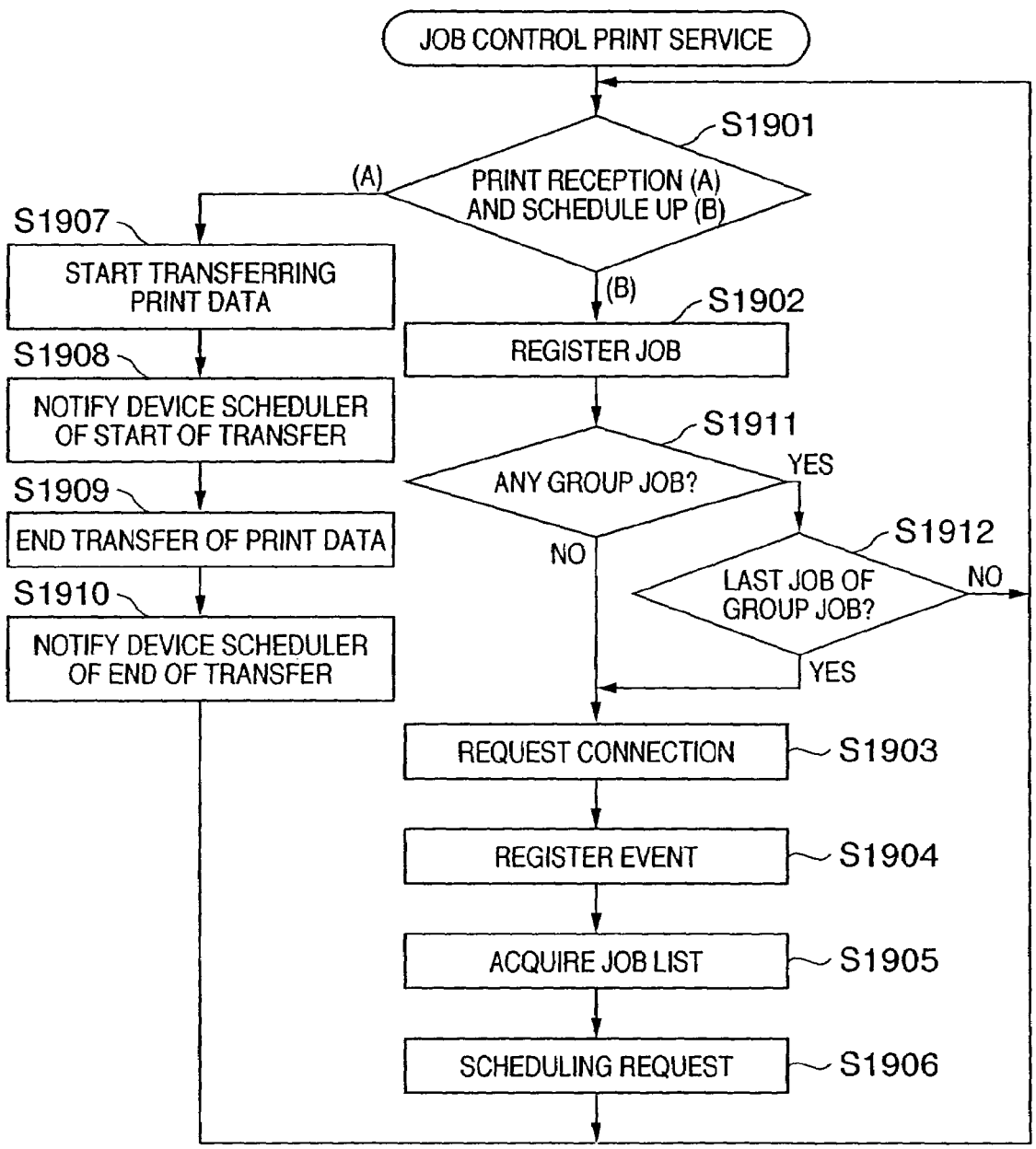
FIG. 19 is a diagram showing the flow of the job control print service starting from reception of print data and going to transfer of the print data.

FIG. 19 shows the flow from reception of print data by the job control print service 605 in any of the clients 101 to 103 until transfer of the print data, the flow being contained in the flow of the printing process shown in FIG. 12.

In step S1901, the communication connection managing section 901 determines whether a print job has been received from the job control port monitor 604 or a schedule up command requesting transfer of print data to be started has been received from the device scheduler 900. If the print job has been received from the job control port monitor 604, the communication connection managing section 901 shifts the processing to step S1902. If the schedule up command has been received, the communication connection managing section 901 shifts the processing to step S1906.

In step S1902, the communication connection managing section 901 sets information on the received print job in the job information 1702 and registers the information in the job management queue 1701.

The information set in the job information 1702 may be acquired from the print system or by analyzing the print data.

In step S1911, the communication connection managing section 901 determines whether or not the received job is a group job. If it is not a group job, the communication connection managing section 901 shifts the processing to step S1903. If it is a group job, the communication connection managing section 901 shifts the processing to step S1912. In order to allow a collective schedule request to be issued for all the plural jobs in the group, the communication connection managing section 901 waits until all the jobs in the group are received.

In step S1912, the communication connection managing section 901 determines whether or not the print job is the last one of the group job. If it is not the last job, the communication connection managing section 901 shifts the processing to step S1901 to accept execution of the remaining part of the group job. In step S1912, once all of the group job is received, the communication connection managing section 901 shifts the processing to step S1903 to issue a scheduling request.

In step S1903, the communication connection managing section 901 connects to the device scheduler 900 to issue a connection request command. When the client issues the connection request, information on the client is registered in the client management queue 1001 of the device scheduler 900. Subsequently, information can be transmitted between the client and the device scheduler 900. If the accepted print job needs to carry out load distribution printing, the communication connection managing section 901 notifies the device scheduler 900 of a load distribution setting upon the connection request. The device scheduler 900 registers the load distribution mode in the client information 1002.

In step S1904, a job event and a device event are registered in the device scheduler 900. Registration of the job event causes notification of changes in the print jobs issued by the client and the other clients. Registration of the device event causes notification of a change in the status of the print device 500.

In step S1905, the communication connection managing section 901 requests a list of jobs registered in the job management queue 1101, managed by the device scheduler 900. The job list and the job event make it possible to determine the statuses of the jobs managed by the device scheduler 900.

The above processing allows all the arrangements to be made for printing. In step S1906, the communication connection managing section 901 sends a scheduling request for the print job to be executed, to the device scheduler 900. In step S1901, the communication connection managing section 901 waits for the next instruction. For example, if the print job is a group job, a scheduling request is issued for all the plural jobs to be combined together.

In step S1901, upon reception of the schedule up command from the device scheduler 900, the command instructing print data to be transferred, the communication connection managing section 901 shifts the processing to step S1907. In step S1907, the communication connection managing section 901 starts transferring the specified job. Once the transfer of the print data is started, the communication connection managing section 901 transmits a transfer start status in step S1908 to notify the device scheduler 900 that the transfer has been started.

When the transfer of the print data is finished in step S1909, the communication connection managing section 901 notifies, in step S1910, the device scheduler 900 that the transfer has been finished.

Figure 20:
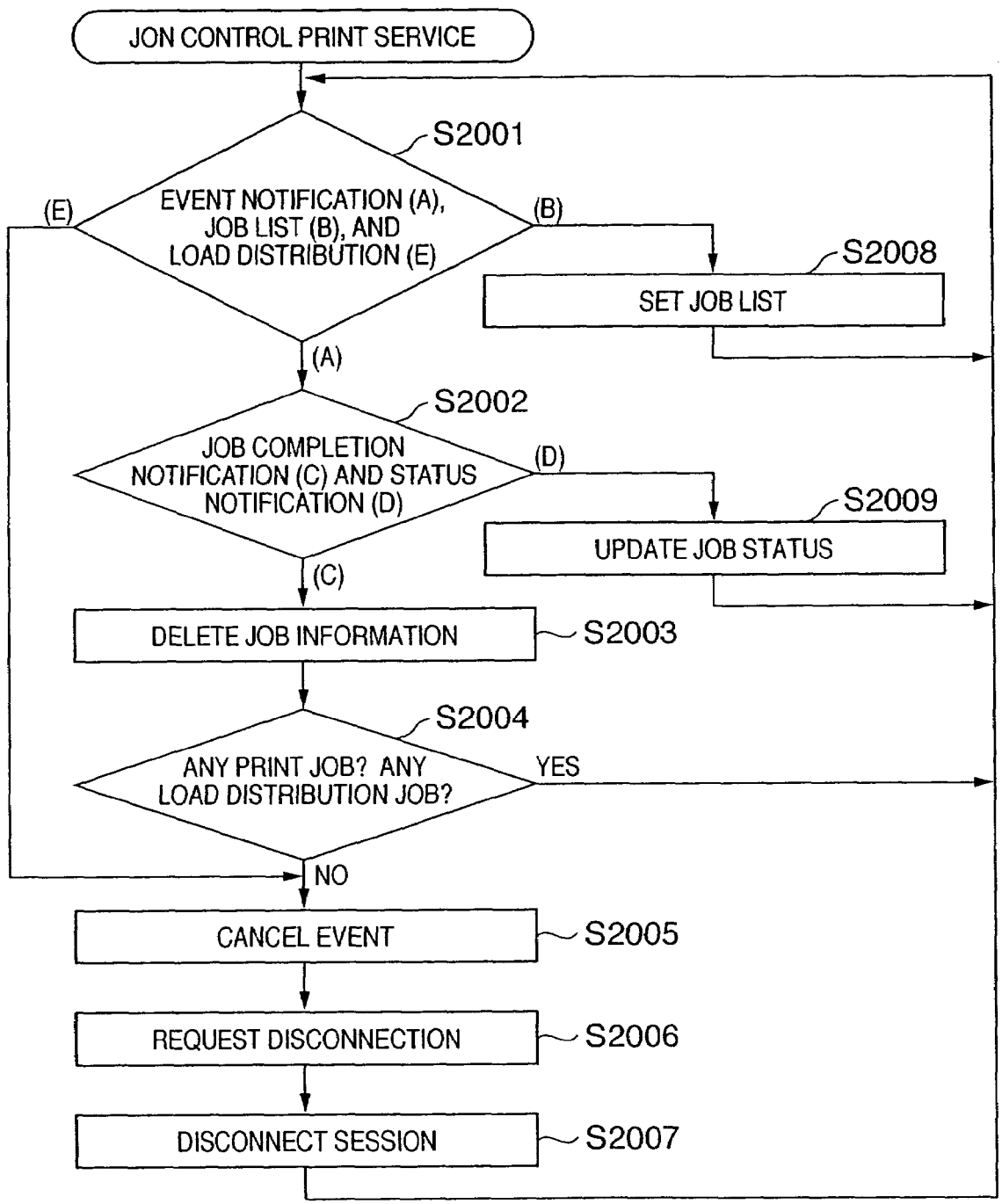
FIG. 20 is a flowchart showing the flow of processing executed by the job control print service if it has received a notification or command from the device scheduler 900.

FIG. 20 is a flowchart of processing executed by the job control print service 605 upon receiving a notification or a command from the device scheduler 900.

In step S2001, the job control print service 605 determines whether the device scheduler 900 notifies the job control print service 605 of a job event or returns a job list to the job control print service 605. In step S2001, upon reception of a job event, the job control print service 605 shifts the processing to step S2002. Upon reception of a job list, the job control print service 605 shifts the processing to step S2008.

In step S2008, when the job list is returned, the job control print service 605 sets (that is, saves) job information from the job list in a job management queue 1701 managed by the job control print service 605.

In step S2002, the job control print service 605 determines whether the job event notification from the device scheduler 900 is a job completion notification or a job status change notification. If it is a job status change notification, the job control print service 605 updates the job status in the corresponding job information in step S2009.

If the received event notification is determined to be a job completion notification in step S2002, the job control print service 605 deletes the corresponding job information from the job management queue 1701 in step S2003.

In step S2004, the job control print service 605 checks if any print job from the client (the print job issued by the client executing this procedure) remains unprocessed in the job management queue 1701. If any process job remains unprocessed, the job control print service 605 must still communicate with the device scheduler 900. Accordingly, to continue the connection to the device scheduler 900, the job control print service 605 shifts the processing to step S2001.

In step S2004, if no job from the client remains unprocessed, the job control print service 605 shifts the processing to step S2005 to start processing required to end the connection to the device scheduler 900.

In step S2004, if the client has a load distribution job and a specification for load distribution is made upon the connection request, the disconnection process is not executed and the job control print service 605 shifts the processing to step S2001 even if the target printer has no job to be executed.

In step S2005, when the connection is started, the job control print service 605 issues a request for cancellation of registration of the job and device events registered in the device scheduler 900. In response to this request, the device scheduler 900 deletes the contents of the event registration from the client information 1002. Without information on event registration, notification of an event does not occur even if the status of any job managed by the device scheduler is changed.

In step S2006, the job control print service 605 issues a disconnection request to the device scheduler 900. Upon reception of the disconnection request, the device scheduler 900 deletes the corresponding client information 1002 from the client management queue 1001.

In step S2007, the job control print service 605 disconnects the session with the device scheduler 900 and causes the processing to stand by in step S2001.

Further, upon sensing the absence of a load distribution printing job., the job control print service 605 shifts from step S2001 to step S2005 to start a disconnection process.

As described above, in the conventional art, even with the scheduling function of the printer, print interruption occurs when a client executes printing directly on the LPD/RAW of the printer without issuing a scheduling request. According to the present invention, if a client attempts to transmit print job to the print device via the device scheduler, the device scheduler controls the print device. Thus, print jobs transmitted without using the intermediate device scheduler are not received. Specifically, for reliable scheduling, the IP block is cancelled only for clients that issue the schedule up status meaning an instruction on transfer of print data so that the clients can communicate with the LPD/RAW.

Thus, the troubles described below can be prevented. The jobs of clients using the scheduling function for printing are caused to wait. Interruptive printing is executed on a group job including a plurality of jobs combined together. Interruptive printing is carried out during load distribution printing in which a large number of jobs are efficiently executed using a plurality of printers. A large number of clients attempt to carry out printing directly on the LPD/RAW of the printer, thus precluding the execution of printing. As a result, even in an environment in which the network printer is shared by a large number of clients carrying out a large amount of printing, the present invention enables printing to be executed efficiently and reliably.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-238624 filed on Aug. 18, 2004, which is hereby incorporated by reference herein.

What is claimed is:

1. A print control device that can communicate with a plurality of information processing apparatuses, the device comprising:
   a managing section that manages at least one scheduling request for a print job from any one of the information processing apparatuses; and
   a control section that prevents or permits reception of print data based on a managing content of said managing section, wherein the control section permits reception of print data not based on a scheduling request if no scheduling request is registered in the managing section.

2. The print control device according to claim 1, wherein the control section prevents reception of print data not based on the scheduling request, on the basis of identification information on any one of the information processing apparatuses having issued the scheduling request.

3. The print control device according to claim 2, further comprising a setting section that registers, in a table, identification information on any one of the information processing apparatuses which permits reception of the print data or identification information on any one of the information processing apparatuses which prevents reception of the print data,
   wherein the control section references the table to permit reception of the print data from any one of the information processing apparatuses corresponding to the identification information for which the reception is permitted, and the setting section changes contents registered in the table so as to prevent the reception of the print data from any one of the information processing apparatuses in response to completion of the reception of the print data transmitted by any one of the information processing apparatuses for which the reception has been permitted or to completion of output of print data received from any one of the information processing apparatuses for which the reception has been permitted.

4. The print control device according to claim 3, wherein if a group job containing a plurality of print jobs associated with one another is received, even when reception of any of the plural print jobs has been finished, the setting section does not change the contents registered in the table so as to prevent the reception of the print data from the information processing apparatus having transmitted the group job until all the plural print jobs included in the group job are received.

5. The print control device according to claim 2, wherein the identification information is IP addresses or MAC addresses of any one of the information processing devices.

6. The print control device according to claim 1, wherein the control section prevents the reception of the print data not based on the scheduling request if at least one scheduling request is registered in the managing section.

7. A method for controlling printing in order to control print jobs from a plurality of information processing apparatuses, the method comprising:
   a managing step of managing at least one scheduling request for print job from any one of the information processing apparatuses; and
   a control step of preventing or permitting reception of print data based on a managing content in said managing step, wherein the control step permits reception of print data not based on a scheduling request if no scheduling request is registered in the managing step.

8. The method for controlling printing according to claim 7, wherein the control step prevents reception of print data not based on a scheduling request, on the basis of identification information on any one of the information processing apparatuses having issued the scheduling request.

9. The method for controlling printing according to claim 8, further comprising a setting step of registering, in a table, identification information on any one of the information processing apparatuses which permits reception of the print data or identification information on any one of the information processing apparatuses which prevents reception of the print data,
   wherein the control step references the table to permit reception of the print data from any one of the information processing apparatuses corresponding to the identification information for which the reception is permitted, and the setting step changes contents registered in the table so as to prevent the reception of the print data from any one of the information processing apparatuses in response to completion of the reception of the print data transmitted by any one of the information processing apparatuses for which the reception has been permitted or to completion of output of print data received from any one of the information processing apparatuses for which the reception has been permitted.

10. The method for controlling printing according to claim 9, wherein if a group job containing a plurality of print jobs associated with one another is received, even when reception of any of the plural print jobs has been finished, the setting step does not change the contents registered in the table so as to prevent the reception of the print data from the information processing apparatus having transmitted the group job until all the plural print jobs included in the group job are received.

11. The method for controlling printing according to claim 8, wherein the identification information is IP addresses or MAC addresses of any one of the information processing devices.

12. The method for controlling printing according to claim 7, wherein the preventing step prevents the reception of the print data not based on the scheduling request if at least one scheduling request is registered in the managing step.

13. A computer-readable storage medium storing a computer-executable program for controlling print jobs from a plurality of information processing apparatuses, the apparatus comprising:

code means for a managing step that manages at least one scheduling request for print job from any one of the information processing apparatuses; and code means for a control step of preventing or permitting reception of print data based on a managing content in said managing step, wherein the control step permits reception of print data not based on a scheduling request if no scheduling request is registered in the managing step.

14. The program according to claim 13, wherein the control step prevents reception of print data not based on a scheduling request, on the basis of identification information on any one of the information processing apparatuses having issued the scheduling request.

15. The program according to claim 14, further comprising code means for a setting step that registers, in a table, identification information on any one of the information processing apparatuses which permits reception of the print data or identification information on any one of the information processing apparatuses which prevents reception of the print data, wherein the control step references the table to permit reception of the print data from any one of the information processing apparatuses corresponding to the identification information for which the reception is permitted, and the setting step changes contents registered in the table so as to prevent the reception of the print data from any one of the information processing apparatuses in response to completion of the reception of the print data transmitted by any one of the information processing apparatuses for which the reception has been permitted or to completion of output of print data received from any one of the information processing apparatuses for which the reception has been permitted.

16. The program according to claim 15, wherein if a group job containing a plurality of print jobs associated with one another is received, even when reception of any of the plural print jobs has been finished, the setting step does not change the contents registered in the table so as to prevent the reception of the print data from the information processing apparatus having transmitted the group job until all the plural print jobs included in the group job are received.

17. The program according to claim 14, wherein the identification information is IP addresses or MAC addresses of any one of the information processing devices.

18. The program according to claim 13, wherein the preventing step prevents the reception of the print data not based on a scheduling request if at least one scheduling request is registered in the managing step.

* * * * *